US006457069B1

(12) United States Patent
Stanley

(10) Patent No.: US 6,457,069 B1
(45) Date of Patent: *Sep. 24, 2002

(54) METHOD AND APPARATUS FOR PROVIDING SUPPORT FOR DYNAMIC RESOURCE ASSIGNMENT AND CONFIGURATION OF PERIPHERAL DEVICES WHEN ENABLING OR DISABLING PLUG-AND-PLAY AWARE OPERATING SYSTEMS

(75) Inventor: Paul C. Stanley, The Woodlands, TX (US)

(73) Assignee: Compaq Information Technologies Group, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/121,448

(22) Filed: Jul. 23, 1998

(51) Int. Cl.[7] .............................. G06F 3/00; G06F 9/26; H03K 8/00
(52) U.S. Cl. ........................ 710/8; 711/100; 711/111; 711/105; 711/200; 326/105; 710/9; 710/10; 710/11; 710/12; 710/14; 710/128
(58) Field of Search ................... 713/323, 1; 710/8–14, 710/104, 49, 18; 711/105, 100; 341/51; 326/105

(56) References Cited

U.S. PATENT DOCUMENTS

| | | | | |
|---|---|---|---|---|
| 4,906,994 A | * | 3/1990 | Hoffmann et al. | 341/51 |
| 5,517,646 A | * | 5/1996 | Piccirillo et al. | 713/1 |
| 5,524,269 A | * | 6/1996 | Hamilton et al. | 710/9 |
| 5,692,219 A | * | 11/1997 | Chan et al. | 710/49 |
| 5,761,448 A | * | 6/1998 | Adamson et al. | 710/104 |

(List continued on next page.)

Primary Examiner—Matthew Smith
Assistant Examiner—Paul Dinh
(74) Attorney, Agent, or Firm—Akin, Gump, Strauss, Hauer & Feld, LLP

(57) ABSTRACT

A computer system allows devices to be unmasked so to be detected or to be masked invisible to the Plug-and-Play architecture or similar architectures. When operating under Plug-and-Play, which assigns systems resources to system devices in a predetermined order despite a limited number of such resources, a user uses software to set the switch in the device's memory such that an undesired device becomes "invisible" to a subsequent power-up configuration of the system. Device configuration proceeds in two phases. During a first configuration phase, the invisible device cannot be configured, i.e. cannot be assigned resources, including interrupt request lines. Hence, those lines remain available to other devices on the system that would not have received resource allocation during a prior-art configuration. During the first phase, the other devices can be assigned the necessary resources to operate properly. Thus, software can command a configuration that would otherwise be impossible. During a second phase, yet-unconfigured devices are configured. When commanded to do so by software, the memory is reset such that the device becomes visible and thus configurable by the Plug-and-Play architecture. The switch is either a non-volatile memory on the device itself, or a dedicated region within the PCI configuration space. When the system is rebooted, the devices that are invisible are not assigned resources, while the visible devices are assigned resources including interrupt request lines. Thus, a programmable select mask prevents configuration of the peripheral during a first configuration phase when the peripheral device is masked and permits configuration of the peripheral during the first configuration phase when the peripheral device is unmasked. A programmable select mask register or a programmable select mask routine (the latter being executable by the processor) includes a mask indicator corresponding to a peripheral device. If desired, the mask indicator itself forms the invention. The invention also includes a step of, during a second configuration phase, configuring the peripheral device.

69 Claims, 9 Drawing Sheets

U.S. PATENT DOCUMENTS 5,805,922 A * 9/1998 Sim et al. ...................... 710/5
5,828,899 A * 10/1998 Richard et al. ................ 710/8
5,867,717 A * 2/1999 Milhaupt et al. ........... 713/323
5,978,860 A * 11/1999 Chan et al. .................... 710/8
5,983,314 A * 11/1999 Merritt ....................... 711/105
5,991,830 A * 11/1999 Beard et al. .................. 710/18

* cited by examiner

| DEVICE NODE SIZE (IN BYTES) | 2 | — 402 |
|---|---|---|
| DEVICE NODE NUMBER (OR HANDLE) | 1 | — 404 |
| DEVICE PRODUCT ID | 4 | — 406 |
| DEVICE TYPE CODE | 3 | — 408 |
| DEVICE NODE ATTRIBUTES | 2 | — 410 |
| ALLOCATION RESOURCE CONFIGURATION DESCRIPTOR | n | — 412 |
| POSSIBLE RESOURCE CONFIGURATION DESCRIPTOR FIELD | n | — 414 |
| COMPATIBLE DEVICE FIELD | n | — 416 |

| 15:9 | RESERVED (MUST BE ZERO) |
|---|---|
| 8:7 | 00 • DEVICE CONFIGURATION IS STATIC<br>01 • DEVICE CONFIGURATION IS DYNAMIC<br>10 • RESERVED<br>11 • DYNAMIC CONFIGURATION IS POSSIBLE BUT STATIC CONFIGURATION IS NOT |
| 6 | 0 • DEVICE IS NOT REMOVABLE; 1 • DEVICE IS REMOVABLE |
| 5 | 0 • DEVICE IS NOT A DOCKING STATION DEVICE;<br>1 • DEVICE IS A DOCKING STATION DEVICE |
| 4 | 0 • DEVICE CANNOT SERVE AS IPL; 1 • DEVICE CAN SERVE AS IPL |
| 3 | 0 • DEVICE CANNOT SERVE AS PRIMARY INPUT DEVICE;<br>1 • DEVICE CAN SERVE AS PRIMARY INPUT DEVICE |
| 2 | 0 • DEVICE CANNOT SERVE AS PRIMARY OUTPUT DEVICE;<br>1 • DEVICE CAN SERVE AS PRIMARY OUTPUT DEVICE |
| 1 | 0 • DEVICE IS CONFIGURABLE; 1 • DEVICE IS NOT CONFIGURABLE |
| 0 | 0 • DEVICE CAN BE DISABLED; 1 • DEVICE CANNOT BE DISABLED |

*FIG. 4A*

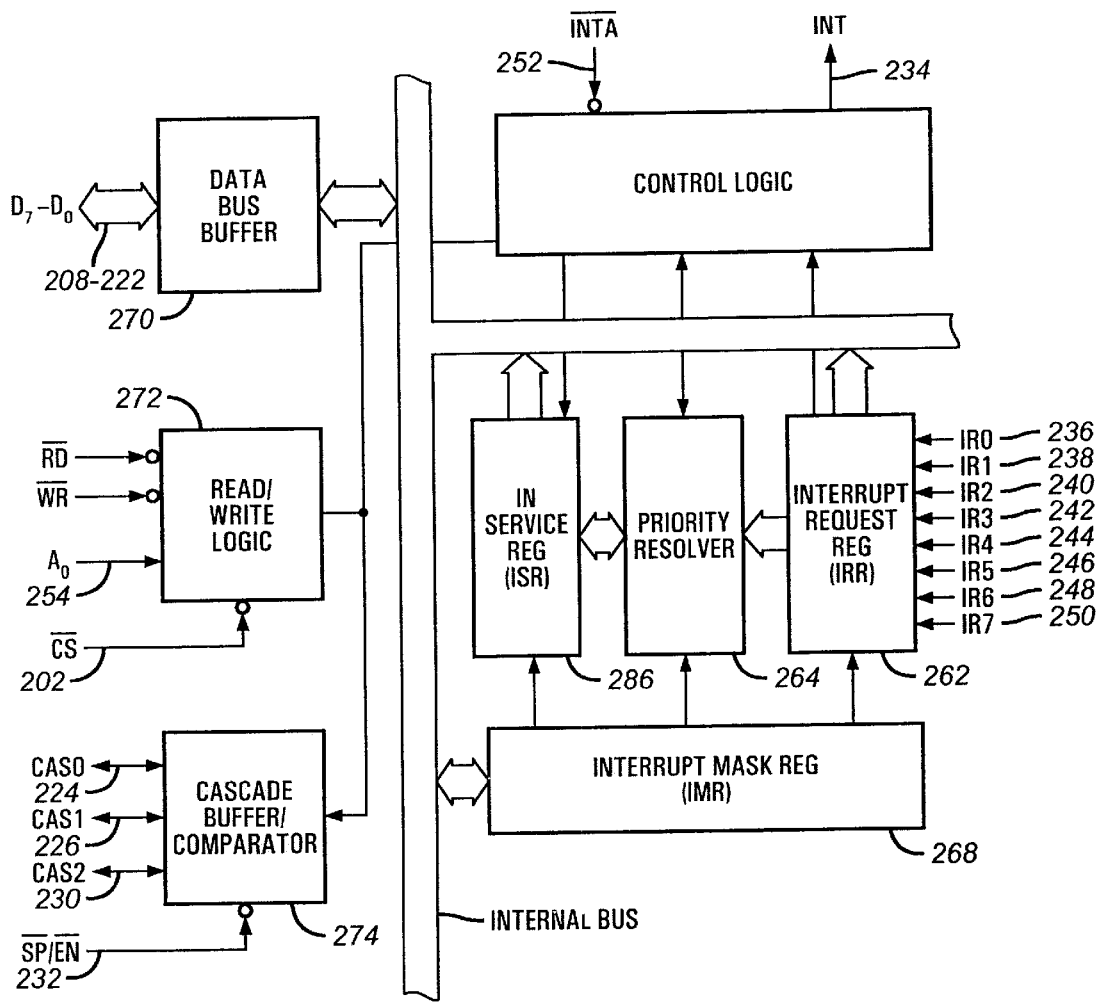
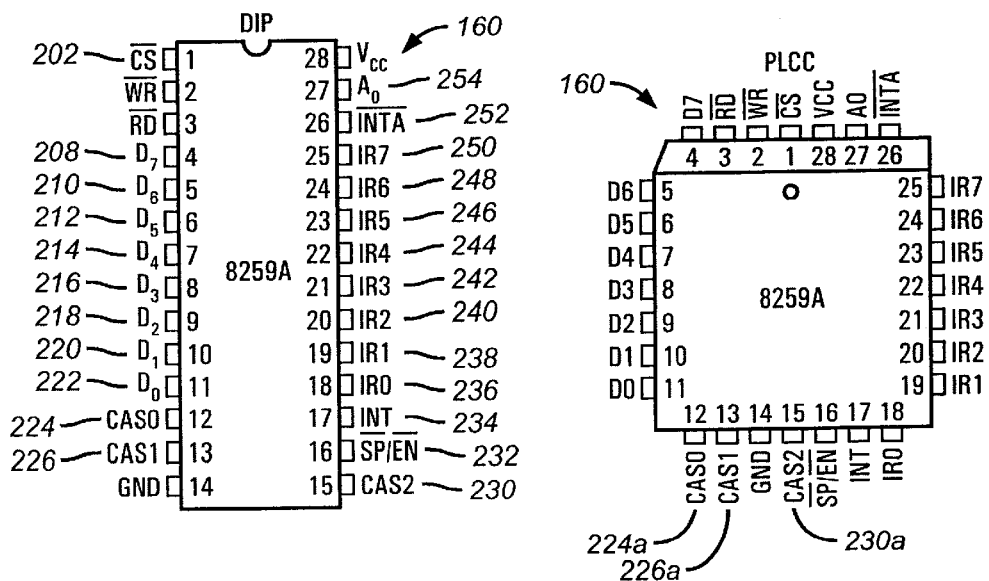
FIG. 5

METHOD AND APPARATUS FOR PROVIDING SUPPORT FOR DYNAMIC RESOURCE ASSIGNMENT AND CONFIGURATION OF PERIPHERAL DEVICES WHEN ENABLING OR DISABLING PLUG-AND-PLAY AWARE OPERATING SYSTEMS

TECHNICAL FIELD

The present invention relates to computer systems and their operating systems, and more specifically to computer hardware configurations dependent on a selected operating system.

BACKGROUND OF THE INVENTION

The computer industry is experiencing rapid changes, as new products emerge and new technologies develop into new products. As new cards, adapters, and other devices have been introduced, an effort has been made to ensure compatibility, not only with the present computer systems, but also with likely directions the computer industry might take in the future.

Both hardware and software compatiility have been of concern, since new products have had to interface with motherboards, interrupt controllers, processors, and memory devices of preexisting systems, and also with preexisting software such as operating systems and applications. To this end, peripherals have been designed to fit into slots in typical bus standards, such as E/ISA, PCI, and MCA Many devices, such as expansion memories, also provide in PROMs infornmation, such as maximum bus speed, that is readable by an operating systenm These systems allow a user to plug a peripheral into a preexisting system, after which the peripheral is able to exchange information with other devices in the system.

Many computer systems have peripheral programmable interrupt controllers that, during run-time, receive interrupt requests from a number of devices and provide both a "summary" interrupt signal and a readable register value contaaing an indicator of which interrupt request was asserted. For example, an Intel® Model 8259A peripheral interrupt controller, or two 8259A peripheral interrupt controllers in cascade, have often been connected to a number of devices to receive signals indicating interrupt requests. When a device or a number of devices assert an interrupt request to an 8259A peripheral interrupt controller, the 8259A peripheral interrupt controller has responded by sending an INT signal to an INTR input of a CPU, and by providing a register with an indicator of the highest-priority interrupt device received since the last INT cycle. The CPU then has read and cleared that indicator from the register. The interrupt requests are asserted on interrupt request lines. The typical AT-compatible computer has 16 such lines, each connected to one ofthe two cascaded 8259A peripheral interrupt controllers. Thus, devices have been able to communicate through hardware with a processor, at run-time.

However, since there are typically a large number of devices in a computer system, the devices must be "configured" to be assigned an interrupt request line. The system cannot "know" at power-up what devices are connected, nor what resources (e.g., interrupt request lines) the device is capable of using. Therefore, configuration is necessary. Configuration is a dynamic process performed at power-up in which the system and devices negotiate a resource assignment. Since there are 16 such interrupt request lines in a typical AT-compatible computer, up to 16 devices may be configured during power up.

To configure a set of devices that are uninown at power-up, the "Plug-and-Play" system architecture has been developed. The Plug-and-Play architecture has allowed a user to install a new card with a device in an add-in slot in a bus, and then power up the machine. The Plug-and-Play architecture has sensed a card vendor's identifier and a device identifier ("ID") from the card or device, and has also sensed what system resources the card or device requires to perform its task. These have been provided in PROMs on the device itself or on a disk accompanying the device when it is purchased or from a file made available over the Internet. The device has thus provided information to the system in both hardware and software. The card has provided a card detection mechanism, a vendor and device ID, a resource list that can be read by the system, and a set of configuration registers or other storage devices that can be read and in many cases, be written into. The system at power up has then scanned each bus in the system to determine the current machine device population, its type, and its resource needs. The system has then proceeded with an isolation algorithm to "isolate" each card, one at a time, and configure the isolated card by assigning resources to it.

Unfortunately, the conflict-resolution approach of the Plug-and-Play system architecture has proven unduly restricting in a number of situations. Because the Plug-and-Play system architecture has assigned resources in order of each card's serial identifier, each time the system has been powered-up, the same set of devices are configured. Those devices have been configured in the same order, session after session. If there are more devices than interrupt request lines, the devices having serial identifiers that are greater than too many other devices in the system are simply never configured under the Plug-and-Play system architecture. Users have occasionally purchased and installed cards for their computer systems, and found that when the cards were plugged into the system, the system could not detect the card, because too many other cards on the system had a smaller serial identifier value. The serial identifier cannot be reprogrammed by the user, since the essential characteristic of the serial identifier is that it differs from the serial identifier of every other device on the system The only solution is to unplug another device that is not being used, and re-boot the system.

It should be noted that the problem is not limited to compatibility with Plug-and-Play. Configuration and arbitration algorithms generally rely on some ordering of devices. Regardless of the configuration scheme used, however, some ordering of devices has typically been used to resolve conflict. The ordering of devices is predetermined by the algorithm itself. The user has typically not been permitted to alter the order, since it is necessary to prevent the user from accidentally giving two or more devices the same position in the ordering.

SUMMARY OF THE INVENTION

Briefly, the present invention includes devices that can be set to be detected or to be invisible to the Plug-and-Play architecture or similar architectures. Each device has a switch with a memory. Each switch is settable by software running on a processor in the system. When commanded to do so by software, the value in the device's memory is set such that the device becomes invisible to a subsequent power-up configuration of the system. The device cannot be configured, i.e. cannot be assigned resources, including interrupt request lines. Because the device cannot receive interrupt request lines, those lines remain available to other devices on the system. The other devices can be assigned the necessary resources to operate properly. Thus, software can command a configuration that would otherwise be impossible. When commanded to do so by software, the memory is reset such that the device becomes visible and thus configurable by the plug-and-Play architecture.

The invention may be embodied in an ID select mask register on the PCI bus. The ID select mask register converts a utilization cycle into two subcycles. During the first subcycle, selected devices are masked and are thus "invisible" to the configuration hardware and software. After the first subeycle is completed, the ID select mask register is then reset, and the second subcycle is permitted to configured all PCI devices on the particular bus.

During each session, the software can command the configuration state of the subsequent session by setting or resetting all of the memories on all of the devices. When the system is rebooted and the Plug-and-Play architecture begins reconfiguring the system, the devices that are invisible are not assigned resources, while the visible devices are assigned resources including interrupt request lines.

BRIEF DESCRIPTION OF THE DRAWINGS

A better understanding of the present invention can be obtained when the following detailed description of the preferred embodiment is considered in conjunction with the following drawings, in which:

FIGS. 4 and 4A show the contents of a device node, known in the art, including a descriptor for primary and alternate interrupt request configurability.

FIG. 5 shows a schematic circuit diagram of a conventional programmable Interrupt Controller.

DETAILED DESCRIPTION OF THE PREFERRED EMBODIMENT

1.0 TYPICAL HARDWARE OF A COMPUTER SYSTEM

Figure 1:
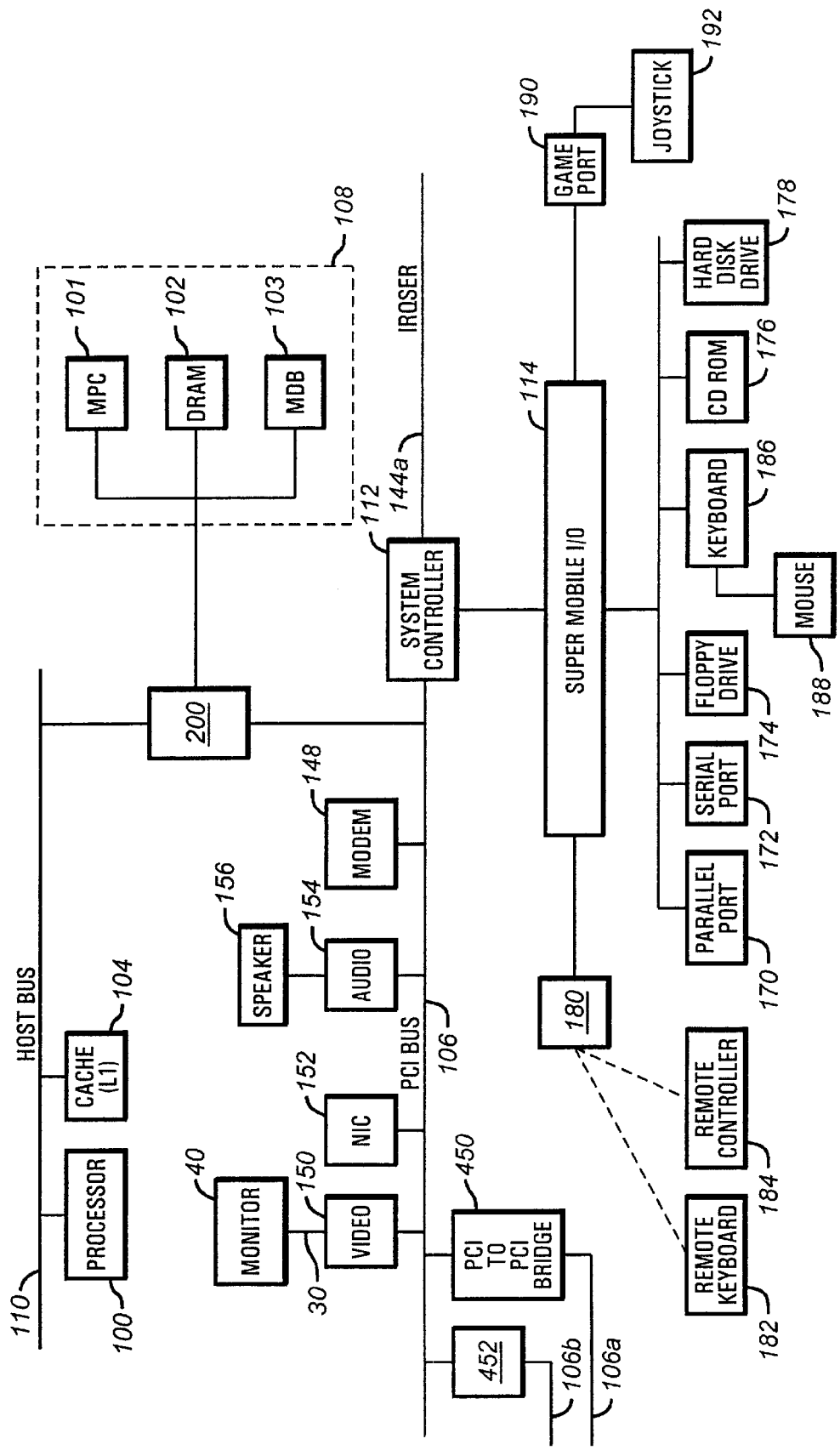
FIG. 1 shows a schematic block diagram of a typical computer system.

Referring now to FIG. 1, a typical computer system 10 is shown. Computer systems typically have a nuber of devices coupled to a system bus or motherboard, including at least one microprocessor, at least one bus, a system memory, an input device such as a keyboard controller and an output device such as video monitor display controller Often, however, computer systems are expanded by adding other devices such as peripheral disk drives, printers, a cache memory, modem connections, other IDEs, audio speakers, and a wide array of other options. Adding still more devices to a computer system can be accomplished via expansion buses, such as buses that conform to PCI, ISA, EISA, microchannel and other bus standards. The buses have slots for receiving expansion cards that can be inserted into the slots. Expansion cards, like the embedded cards on the motherboard, are inserted into either the motherboard or an expansion bus where the cards are accessible to other devices in the system. Most expansion devices are generally connected via a cable or wire to a small card that comes with one or more devices. To use the device, someone inserts the card into one of the slots in one of the buses in the computer system, restarts (or "reboots") the system, and the device is now available.

As shown in FIG. 1, a central processing unit 100 is coupled to a host bus 110. The central processing unit 100 may be a single microprocessor, such an Intel Corporation's 486 or Pentium, or a more complete CPU system including multiple microprocessors, a cache controller, external co-processors, and other components, coupled to one another or to the host bus 110. The host bus 110 functions to interface the central processing unit 100 to the rest of the computer system C. The host bus 110 typically is located on a motherboard, but may be configured as any of a number of other subsystems, as known in the art.

Also coupled to the host bus 110 is a cache 104. The cache may be a write through, a write back, or multi-level cache system for storing commonly used or recently used data values. The cache generally consists of a high-speed static RAM structure, addressable within the memory space of the CPU's address lines.

A main memory 108, typically comprising a dynamic RAM 102, is coupled to the host bus 110. The main memory provides relatively high-speed data storage for instructions and data needed for the processor to perform its functions.

Also typically coupled to the host bus 110 are two extension buses. The first extension bus is a PCI bus 106, coupled to the host bus 110 via a north bridge memory control 200. The PCI bus 106 is coupled to a plurality of additional devices, including a video card 150, a network interface controller 152, an audio device or audio card 154, a fax modem 148, and in some embodiments an additional PCI bridges 450 and 452. The video card 150 typically includes a graphics processor and a video graphics adapter, and is coupled to a monitor 40 via a coaxial cable 30 or other computer connector. The audio device or audio card 154 generally is coupled to audio speakers 156 or other audio output device to provide an audio output.

Also coupled to the first extension bus 106 is a system controller 112. The system controller 112 typically has a number of IDE ports to couple external devices 170–192 via an input/output device 114. The input/output device 114 may be coupled directly to the CPU or to main memory, or may be a separate device on the host bus 110. The input/output device 114 provides a connection to a parallel port 170, serial port 172, keyboard 186 having a mouse port 188, a CD ROM 176, a hard disk drive 178, a remote controller interface 180, and a floppy disc drive 174. The CD ROM 176 provides optical storage and data retrieval capabilities, and the hard disk drive 178 and floppy disc drive 174 provide magnetic storage device capabilities to the computer systenm The input/output controller 114 also provides connection to a game port 190 having a joy stick 192. It will be recognized that other configurations are possible; for example, the joystick 192 may instead be coupled to an infrared device for communicating directly to the remote controller interface 180.

The remote controller interface 180, coupled to the second extension bus 106a via the controller 114, provides infrared signal detection, and is optically and remotely coupled to a remote keyboard 182 and a remote controller 184. The remote keyboard 182 and remote controller 184 allow a human user or an external device to communicate data via the remote controller interface 180 to the computer system, without direct wired connection.

A system ROM 116, on the host bus 110, typically includes the system firmware, including the BIOS, installed automatically when power is applied to the systemn The firmware may be run statically from the system ROW or may be shadowed into system RAM and run dynamically from the RAM. In many computer systems, the hardware configure itself according to the instructions in the BIOS upon power up.

It will be recognized that additional devices may be coupled via IDE controllers and other connectors to the various buses, providing resources and buffering for external devices. The flexibility of the computer system therefore is not restricted to the particular example shown in the figure. Moreover, as stated above, additional devices may be added to a computer system via expansion buses, by inserting into a bus slot an expansion card that is connected via a cable or wire to the additional device.

A second extension bus 106a is coupled to the host bus 110, providing an extension for additional peripheral components. Although typically configured as an X-bus or an ISA bus, the extension bus 106a may alternately be configured as an EISA, a PCI bus, a microchannel bus, or any of a variety of other bus structures commonly used and known.

Devices that exchange data with the microprocessor typically are assigned IO space allocations that may or may not be shared with other devices. Devices include memories, as well as peripheral and other devices. To encode the process of communicating with the devices in the system, the POST typically creates within non-volatile memory an allocation map, allowing a particular device to be identified by an identifier or "handle" of only a few bits, and a controller to translate the handle into an identification of the corresponding resource by IO address. For example, a printer may have an identifier or "handle" or other brief identifier, a resource such as an interrupt request line, and an IO space allocation for addressing characters from the microprocessor to the printer. The microprocessor can then address the particular IO location to send data to the printer, and the printer can use the interrupt request line to indicate a "ready to receive data" status or a printer-problem status. The map is in the form of a table, and if it is in nonvolatile memory, start ups with the list of resources assigned to configurable installed devices during a previous session.

Also shown in FIG. 1, a peripheral interrupt controller 160 is coupled to the first extension bus 106. The peripheral interrupt controller (PIC) 160 is a chip for the management of several hardware interrupts and the ordered transfer of the requests to a CPU, which usually has only one input for such an interrupt request. Thus, the programmable peripheral interrupts controller 160 serves as a multiplexer for hardware interrupts. Although typically in the XT and AT-compatible computers, the peripheral intenupt controller 160 is typically an 8259A peripheral interrupt controller (FIG. 6), in more modern systems an Advanced Peripheral Interrupt Controller (APIC) (FIG. 7) may be substituted.

The 8259A programmable interrupt controller 160 manages external hardware interrupts from peripherals, including the hard disk controller 118. Although the 8259A programmable interrupt controller has eigh input channels connected to the chip, each of which may issue an interrupt request, in AT-compatible systems such as system 10 two 8259A peripheral interrupt controllers are typically cascaded, a master peripheral interrupt controller having interrupts numbered IRQ 0–7, and a slave peripheral interrupt controller having interrupts numbered IRQ 8–15. The two peripheral interrupt controllers are connected forming a master-slave interrupt controller structure, IRQ 2 being typically tied to IRQ 9 to provide a combined capability of fourteen external interrupts. In other systems, the INT output of the slave is connected to the master's IRQ 2 , allowing cascaded capability of fifteen interrupts. A non-maskable interrupt (NMI), when used in a computer system 10, typically does not couple to the peripheral interrupt controller 160.

1.1 THE SYSTEM ROM

As stated above, in a typical computer system 10, a system ROM 116 is coupled to the motherboard's main bus, the host bus 110. The system firmware typically resides in the system ROM 116, located on the motherboard. The system ROM 116 typically contains a system BIOS that is specifically tailored for the system hardware, or for a limited predetermined set of possible hardware configurations. A BIOS designed for one system generally will not operate properly, if at all, on another system unless the two systems are identical in design, or differ in design only in one of the predetermined ways that the BIOS can accommodate. Because of the close association of the BIOS and the hardware design, BIOS development is considered an extension of hardware design, not software. As new hardware designs are produced, manufacturers must develop variations to existing BIOS routines, or new BIOS routines altogether, to handle the new hardware. Moreover, many new BIOS routines are intended to retain some backward compatibility with prior hardware versions, adding complexity to the design.

Although different BIOS designs perform essentially the same steps in slightly different order, the BIOS must at some point read registers within the devices themselves to determine what devices exist on the system, and what the resource requirements are for those devices. Only after reading these registers can the BIOS determine an appropriate allocation of system resources to configure a maximum number of devices. Also, the BIOS can determine from the informatioin obtained from device registers what drivers to load into memory, to allow the microprocessor to access the device. The driver may be in the ROM as well, particularly if the driver is nonstandard; if multiple devices use the same driver, however, the BIOS may load all into memory when the system is initialized.

1.1.1 THE SYSTEM POST ROUTINE

As shown in FIG. 1, a typical computer system includes a number of devices (in addition to the system ROM 116) residing on the system buses. Because these devices may be changed for other devices by a user, the system cannot "know" beforehand what devices are coupled to the system. Determining what devices are on the system, configuration of the devices, setting up memory for the operating system, and initializing and testing hardware (POST, Power On Self Test) are performed by the BIOS.

Each platform typically includes a number of unconfigurable devices requiring specific, dedicated resources, and a nunber of configurable devices. The POST program may be structured for a particular platform, in which case it is designed to accommodate a particular set of unconfigurable system resources.

Figure 2:
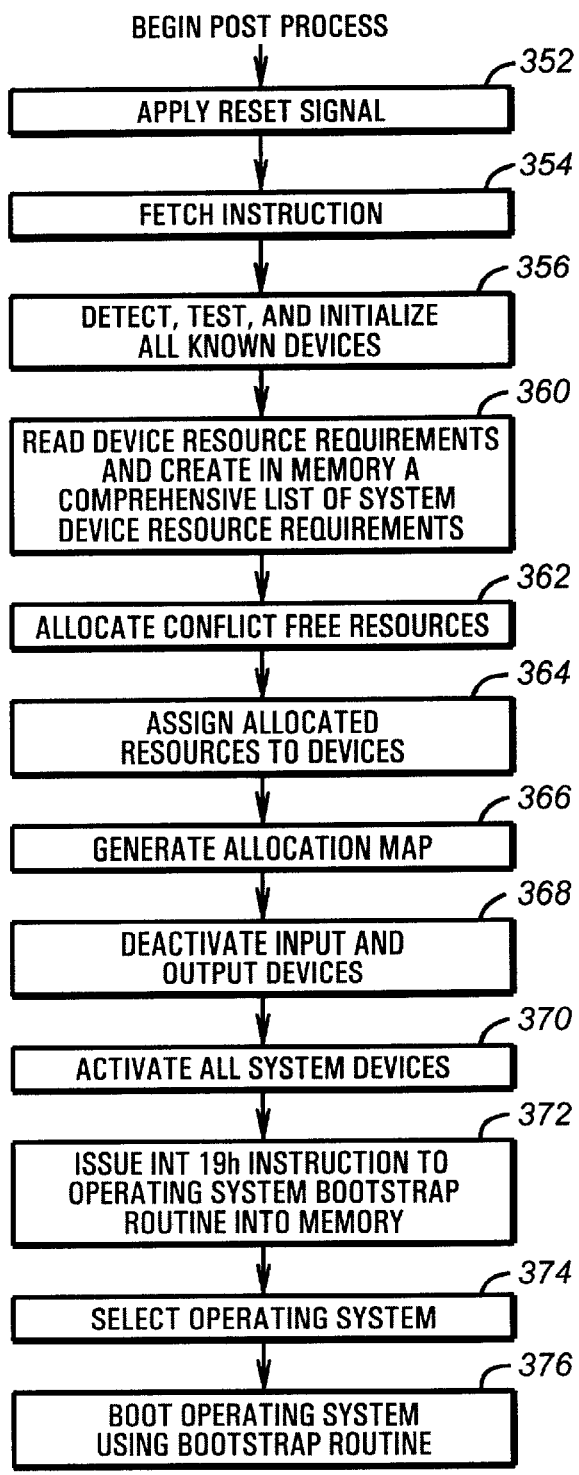
FIG. 2 shows a flow chart of a typical Power-On Self Test ("POST") process, according to the Plug-and-Play architecture.

Referring now to FIG. 2, a flow chart representing a typical POST sequence, according to the plug-and-play system architecture, is shown. As stated previously, the POST and other BIOS routines are typically stored in a system ROM 116 and shadowed (i.e., copied) into RAM for faster execution and wider data channels. The PCI spec requires shadowing and other bus specifications also strongy recommend it. At step 202, a reset signal is applied and remains active until power supply outputs have stabilized. The reset signal forces all device logic to a predefined state, insuring global initialization predictability. At step 354, a first instruction is fetched from a predefined restart address. The fetching of the restart address occurs when the reset signal is deactivated, normally as soon as power fluctuations have stabilized. The fetched address is the entry point of the POST program, typically in system ROM 116 memory.

The POST routine is then shadowed in to RAM, where it may then be run more quickly. At step 356, the POST detects, tests, and initializes all known devices to the state for nonral system operation. In step 356, devices, including the interrupt controller, the DMA controller, and programmable timers, as well as other devices, are merely turned on, tested, and set to a default state (i.e., a "wait" or "wait for key" state) for the device, having no device configuration, IO space allocation, or resource assignment.

As part of the initialization, the POST then tries to turn all of the devices off, to determine which devices might be useful in finding and launching the operating system. Typically, devices that might be useful in finding and launching the operating system cannot be deactivated by software; they are activated so long as power is applied to the system. Also, such devices cannot be reallocated, since they need specific, dedicated resources. By attempting to turn off the devices, only those that are useful for booting the operating system remain activated. These devices ("known as initial program load" or IPL devices) include the system ROM 116, and generally include a keyboard controller and a video adapter as well. All other devices are deactivated.

Because the purpose of the BIOS is to prepare the system for the booting of an operating system, devices are segregated into two groups: one group, the IPL devices, are detemined to be needed for booting the operating system. The IPL devices must be configured prior to loading the operating system. The other group of devices all or some of which can be configured or deactivated by the software, are typically initiated and configured by the BIOS unless it is determined that a Plug-and-Play compatible operating system is to be booted. This is because Plug-and-Play compatible operating systems typically can perform their own hardware configurations.

The POST then turns the other devices back on, and sets them to a "wait" state (also known as the "wait for key" state). The devices remain in the wait state until isolated and configured by the BIOS. Step 356 is completed when the configurable devices are transitioned to the wait state. Isolation of Plug-and-Play devices is described below with reference to FIG. 3, to provide a filler understanding of device configuration. It will be recognized that the ISA paradigm is not directly affected by the invention.

The IPL devices, now having been identified, are initialized by performing any initialization routines contained within the IPL device ROMs. In anticipation of loading an operating system that may not be compatible with the Plug-and-Play methodology, all devices may be activated and initialized; but when Plug-and-Play operating systems are used, only certain IPL devices are used. Therefore, any necessay device is activated and initialized according to its option ROM. For example, Windows 95 Plug-and-Play architecture contains a BIOS that configured all devices, because the BIOS cannot predict that a Plug-and-Play operating system will be loaded.

If the operating system cannot perform system configuration, the BIOS continues configuring the system, and then launches the operating system before terminating. If the operating system can perform system configuration, the BIOS launches the operating system and terminates, allowing the operating system to continue with system configuration.

The system BIOS is designed to have access to system resource information, and therefore "knows" what system resources are available. The devices are isolated and are read to determine the resource requirements of the devices. In step 360 a comprehensive list of system resources is created in memory, and the system devices are configured. In step 362, conflict-free resources are allocated, and in step 364, an allocation map storing the system configuration is generated and verified, completing the configuration process. At step 368, all system devices are activated and deactivated, to identify any additional devices needed to boot the operating system, and if any are found steps 206–218 are repeated to allocate the necessary resources to the necessary devices.

At step 370, all system devices are activated. At step 372, an INT 19h command is issued by the POST to load the bootstrap routine into memory. The OS bootstrap routine actually loads the operating system, and hooks necessary memory locations to the operating system pointers. The operating system is selected at step 374 (usually, onlly one is available, although more may be present and identified as being useable only if no preferred operating system is present). At step 376, the selected operating system is booted using the bootstrap routine. System configuration assigns system resources to configurable devices, avoiding conflicting assignments and ensuring that each device receives adequate resource allocation to perform its functions. Typically, system configuration begins when all configurable devices are in the wait state. Any activated devices that have option ROMs but that have not been initialized, are initialized according to their option ROMs. A double check is performed to determine whether any Plug-and-Play ISA devices have been activated but not initialized, and if any such ISA devices are found and have option ROMs corresponding thereto, the option ROMs are read for initialization code which is then executed. All devices in the system are checked for device ROMs and are initialized from the device ROMs.

System configuration includes device ROM shadowing and initialization, device isolation, resource requirement identification, available system resource determination, and resource allocation. These operations are now described in more detail.

1.1.2 SYSTEM DEVICE ISOLATION

One embodiment of the invention is now described in greater detail, in terms of an ISA/EISA implementation. The description, however, should not be construed as overlooking alternative bus structures.

Once the devices are activated and are placed in the wait state, the devices are isolated. The isolation routine for Plug-and-Play devices is described with reference to FIG. 3, to provide a fuller understanding of device confiuration. It will be recognized that the ISA paradigm is not directly affected by the invention. Device isolation assigns to each card a unique number to distinguish the card from the other cards within the system. The unique assignment of a Card Serial Number (CSN) to each card is compatible with the EISA specification. The CSN is a unique number that provides an identifier or "handle" by which the microprocessor can indicate over the system bus that a particular message is intended for a particular device, and by which a device can identify itself when generating interrupt and other messages for the microprocessor.

Uniquely identifying cards in the system is vital to proper operation. If multiple identical devices are used in the same system, and no effort is made to distinguish the devices, the result is unpredictable. For example, if one of several printers in a system sends an interrupt request to the peripheral interrupt controller indicating that a paper-tray is empty, and the microprocessor could not identify the particular printer, the device driver associated with the printer might unfortunately terminate all data to all of the other similarly-configured devices until the problem is fixed. Similarly, if another device sends a "status-okay" signal, the data stream for the inoperable device may be resumed prematurely.

The isolation routines of the Plug-and-Play methodology rely on the use of EISA-like 72-bit serial identifier (64-bit value plus 8-bit checksum) that manufacturers ensure will be different for any two devices in the system. Each vendor is assigned a unique 32-bit value with which the serial bit identifier of each device the vendor provides must begin. The vendor then provides a different 32-bit sequence for each unit of like type produced. This ensures that each device in the system has a different non-zero 72-bit (9-byte) serial identifier.

Each plug and play device has a configuration port having a number of register stacks. Each device stores its serial identifier in a read-only register in register stack location 01h of the configuration port, also known as the serial isolation register. The CSN, when assigned, is located in register stack location 06h.

Figure 3:
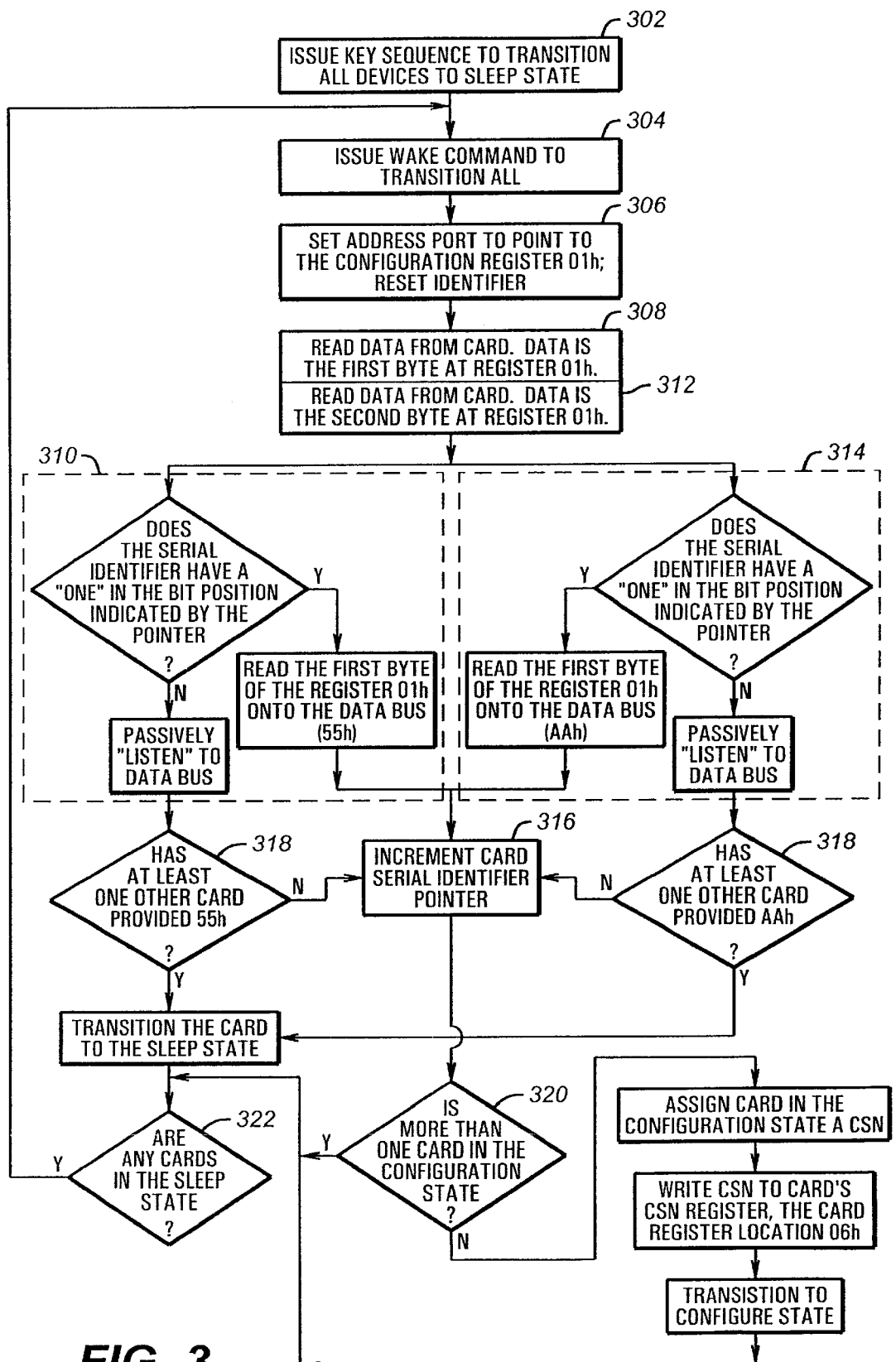
FIG. 3 shows a flow chart of device isolation according to the Plug-and-Play architecture known in the art.

Referring now to FIG. 3, to isolate each card and assign a unique CSN to each card, at step 302 the configuration routine (either the BIOS or the operating system) initially transitions all configurable devices to a sleep state by issuing a key sequence. Isolation of Plug-and-Play devices is described to provide a fuller understanding of device configuration. It will be recognized that the ISA paradigm is not directly affected by the invention.

At step 304, the configuration software then issues a wake command with a CSN of 00h. This is accomplished by writing a 03h to the address port and 00h to the write data port of each device in the system. Each card compares the zero value in its 03h register (wake command register) with the zero value in its 06h register (CSN register), and since all have a compare, all transition to the isolation state. In other words, in response to the wake signal and the CSN of 00h, each card lacking a CSN transitions to an isolation state and resets its serial identifier pointer to the first bit of the identifier. However, cards that have a CSN ignore "wake" signals (or transition to the sleep state). Because initially all configurable cards lack a CSN, all cards transition to the isolation state when the "wake" signal is generated. The wake command further resets the bit pointer in the serial isolation register of each awakened card to the first bit.

At step 306, the configuration software sets the address port to the device's configuration register 01h. All subsequent read-commands will be addressed to the serial bit identifier of the card. At step 308, a pair of read-commands is issued to all cards in the isolation state in the system. The pair of read commands causes all the cards in the isolation state to provide the first bit of their respective serial bit identifiers as data on the data bus—all cards in the isolation state are read simultaneously. A pair of read commands is needed, since each bit of the serial bit identifier is actually stored as a pair of bytes, with a one-bit being stored as a 55h/AAh and a zero-bit being stored as a 00h/00h. It will be noted that 55h ternnnates in an 01b, while AAh terminates in a 10b. At step 310, those cards with a one-bit in the position indicated by the serial identifier pointer returns a 55h, but the cards with a zero-bit in the position indicated by the serial identifier pointer do not return any value at all, but rather passively determine whether at least one other card is providing a 55h. At step 312, a second read-command is issued to all cards in the system. At step 314, those cards with a one-bit in the position indicated by the serial identifier pointer retuns a AAh, but the cards with a zero-bit in the position indicated by the serial identifier pointer do not return any value at all, but rather passively determine whether at least one other card is providing a AAh. At step 316, those cards with a onebit in the position indicated by the serial identifier pointer increment the pointer to the next serial identifier position.

At step 318, all zero-bit cards that have passively observed the data bus determine whether at least one other card was observed to provide a 55h/AAh as data. This determination is uacly accomplished by observed the last two bits on the data bus; a 01b/10b indicates that at least one other card provided a 55h/AAh, while 00h/00h indicates that all other cards failed to provide data. If at least one other card was observed to provide a 55h/AAh as data, all cards having a zero-bit transition back to the sleep state. However, if no other card was observed to provide a 55/AAh as data, then all cards must have a zero-bit in the position indicated by the serial identifier pointer, all remain in the isolation state, and increment the serial identifier pointer to the next serial identifier position.

So long as more than one card remains in the configuration state, at step 320, the configuration software then loops back to step 308, where another pair of read commands is issued by the bus master (the microprocessor). If only one card remains in the configuration state, that card is assigned an 8-bit CSN, which is written to the card's CSN register location 06h in the card's configuration register stack; a "06h" is written to the address port and the CSN written to the data port). A device being assigned a non-zero CSN is taansitioned to the configure state. At step 322, ihe configuration software determnines whether any cards remain in the sleep state, if so, control loops back to step 304. Cards having a CSN transition to the sleep state, while cards lacking a CSN transition to the isolation state and begin isolation. This is accomplished by writing a 03h to the address port and 00h to the write data port of each device in the system. Each card compares the value in its 03h register (wake command register) with its 06h register (CSN register), and those that compare transition to isolation state while those that miscompare transition to the sleep state.

Assuming no contention on the read data port by legacy ISA cards, this process produces a unique CSN for each card in the system. Thereafter, all cards can be kept in the sleep state until needed.

There is a state for cards that have been assigned CSNs: the "configure" state. When a card is needed, it can be transitioned to the configure state by writing 03h to the address port and the CSN of the desired card to write data port, writing the desired CSN into the wake command registers of all of the cards. The card with the CSN compare (i.e., the same value in the wake command register and the card select number register) transitions to the configure state, while all of the other cards either remain in or transition to the sleep state.

1.1.3 RESOURCE REQUIREMENTS IDENTIFICATION

Continuing with the EISA-based example, once all the cards have been isolated, the configuration software (e.g., the EISA bus enumerator program in Windows 95) wakes up each card (transitioning the card from the sleep state to the configuration state), reads its configuration registers, and then returns the card to the sleep state. In this way, the configuration software builds a comprehensive table of all resource requirements in the system.

Reading the configuration registers itself includes a number of steps. The card is placed in the configuration state. This is accomplished either during the initial assignment of the CSN, in which the card is temporarily placed in the configuration state, or during a subsequent transition by writing the desired CSN in the wake register of all cards. Once the card is in the configuration state, the card resource requirements are read, one byte at a time, in handshake mode (i.e., requiring a data-ready asynchronous signal in the status register). Each card contains a card response data structure identifying the number of devices on the card, and also identifying the resources requirements of each separate device on the card as well as the requirements of the card itself All of these requirements are read from the card and provided into memory during the resource requirements identification phase.

The resource requirements comprise a sequence of devnodes, each containing a list of descriptors. The structure of the devnodes is explained below, with reference to FIG. 4.

As stated above with respect to FIG. 2, and specifically with respect to step 360, a comprehensive list of the resource needs associated with each and every active device is created. Moreover, all the buses in the system are scanned to determine resource requirements for each device on each bus, as well as for devices separated from system buses by bus bridges. Because bus bridges allow external expansion buses to be added to the embedded buses of existing systems, this is hardware-driven process, as buses are detected and scanned. Each device is polled individually to ascertain from the device what resources must be assigned for the device to function. Some devices require specific resources, while others are more flexible.

Also, while each card is in the configuration state, each device on the card (if there are multiple devices) is assigned a unique logical device number (LDN).

1.1.4 AVAILABLE SYSTEM RESOURCE DETERMINATION

Continuing with the EISA-based plug-and-play description, as stated previously, the BIOS is typically developed independently of the system hardware, so that the BIOS is compatible with a variety of hardware devices. However, the BIOS must be platform compatible, so that the BIOS is aware of the system resources available on the system. The BIOS must have access to information about the system itsel, the number of motherboard interrupts, the type of peripheral interrupt controller, the overall size of memory, and other systemboard and system resources. This information allows the BIOS to allocate existing resources to the devices as needed.

When a system is designed, the designers include a number of IO devices, such as a keyboard controller, a display controller, a serial port, a parallel port, a video graphics adapter, and other devices as part of standard system configuration. Systems designers also anticipate a set of expected peripherals and plug-ins that will be added to the system. System resources appropriate to the peripherals and plug-ins are included in the motherboard, and the BIOS is designed to accommodate the system resources, the embedded devices, and the peripherals and plug-ins that are likely to be added to the system. During operation, the BIOS routines, in the system ROM 116 shipped with the system, convert microprocessor commands and requests into IO reads and writes that accomplish the request.

Because the BIOS is considered part of the system itself, the BIOS always has a list of available system resources. These resources typically include interrupt requests, IO ranges, and other features accessible to the microprocessor and assignable to the devices. As new products come on the market for which the BIOS is inappropriate, the user may purchase BIOS upgrades from the BIOS developer that will allow the system to configure the new devices. Development of devices, therefore, requires either that devices be configurable by existing configuration software, or that BIOS upgrades be made available so that existing systems can use the new devices.

Also, the BIOS must maintain a number of bus-specific enumerator programs to read configuration registers associated with system buses. The configuration software typically calls the appropriate bus enumerator routine when access to a bus is needed. As new buses are added to the system, the BIOS must be upgraded to accommodate the new buses. This futer requires system-specific BIOSes.

1.1.5 RESOURCE ALLOCATION

Continuing with the EISA-based description, as stated above with reference to FIG. 2, at step 360, a comprehensive list of the resource requirements associated with each and every active device is created. These resource requirements comprise a sequence of devnodes, one of which must be selected by the configuration software. The structure of a device devnode is described below with reference to FIG. 4, but includes a list of descriptors defining alternative resources. FIG. 4A shows the bit-level configuration of the device node attributes field 408. The configuration software determines a set of descriptors defining a permissible nonconflicting resource allocation for a device, and then determines values for the configuration registers of the device. Once the values are determined, all that remains is to copy the values into the proper device on the proper card.

As stated above, the BIOS maintains a list of all of the available system resources. This list is defined by the system motherboard designer, and is part of the BIOS itself. The list of available resources is used in the selection of devnode descriptors, since it is the limited number of system resources that controls the configuration process.

During resource allocation, these lists are compared to determine a nonconflicting resource allocation. The process of deternming a nonconflicting resource allocation is limited by the configurations allowed for each device.

Once the mapping of nonconflicting resources is determined, the resource assignment of each device is written into the configuration registers of the device. This is accomplished by placing each card in the configuration state, selecting the target logical device on the card, and writing the assignment into the appropriate device level register.

As stated previously, each card contains a number of cardevel register stacks, including card-level CSN register at register stack location 06h, a wake command register at register stack location 03h, and a Set Read Data Port address register at register stack location 00h. Register stack locations from 00h to 2Fh are used for card-level registers. However, included in the card-level register stacks is the logical device number register ("LDN register"), at register stack location 07h. When the configuration software determines the configuration (i.e., the resource assignment) of a target device, the configuration software transitions the card on which the target device resides into the configuration state by writing the CSN of the desired card into the wake command registers of all the cards in the system. Then, once the desired card is in the configure state and all other cards are in the sleep state, the logical number of the device is stored in the logical device number register of the card under configuration.

In addition to the card-level register stacks at locations 00h to 2Fh, each card having multiple devices finther contains a plurality of device-level register stacks 30h to FFh, storing device configuration status. To configure a particular device, the configuration software writes the logical device number of the target device into the logical device number register (at register stack location 07h). (ro write the logical device number in the proper stack location, 07h is written to the Set Read Data Port address register and the logical device nunber applied to the data lines.) Once the logical device number (LSN) of the desired logical device is in the logical device number register, all subsequent reads and writes to and from register stack locations above 2Fh (i.e., 30h–FFh) provide access to the device-level registers. Although each device has some device control registers, including the activate register, the IO range check register, and some vendor-defined device control regsters, most of the device-level registers are device configuration registers.

Once the logical device number of the target device is identified and written to the logical device number register, the particular configuration register to be written to is selected. The configuration registers contain prograable memory, programmable IO address decoders, or programmiable selectors used to select an interrupt or a DMA channel. To select a particular configuration register, the address of the specific configuration register under configuration is written to the configuration address port IO location 0279h (and 0A79h). Subsequent access to the read data or write data port accesses the register having the address stored in location 0279h. (Actually, six bits of the location 0279h, all 8-bits of location 0A79h, and two additional bits hardwired to zero determined the address of the configuration register being addressed.)

Because device configuration registers are vendor-defined, some complying with the ISA specification and others with the PCI specification, for example, different devices have different addressing of configuration register locations. However, some of the configuration registers have common bit definitions. For example, certain bits define whether the device is an ISA device, whether it can perform as an 8-bit, 16-bit, or 23-bit device.

Referring again to FIG. 2, at step 362, conflict free resources are allocated to any devices in the system that may have been configured according to the configuration routine of the BIOS. All devices are assigned conflict free resources, although none of the devices are activated until the allocation process is completed. At step 364, the POST software assigns resources to each configurable device, avoiding resource conflicts and furier avoiding assigning predetermined and embedded resource allocations consumed by legacy and embedded devices using fixed resources. This assignment of resources is referred to as configuration, and can be complex, particularly if several identical devices are included in the system, if devices require specific scarce resources, or if the system does not include sufficient compatible resources. Any devices determined to be enabled by the POST are then activated, and any Plug-and-Play device ROMs associated with the devices are called as initalizaton code and executed.

Configuration of the system then proceeds. while configuring the devices, the POST also generates an allocation map, representing the allocation of IO space and resources in a tabular form within memory. The memory used may be a volile RAM, a non-volatile PROM, or a ROM shadowed in RAM. The latter is the more common and more useful, since it allows a dynamic RAM configuration that can be changed by software and applied to the current session, while also allowing a static PROM to be written, to create a default boot-up configuration for the next session. The entire allocation is represented in the allocation map and conflicts checked, before actually providing the resource-allocations to the devices. At step 366, the POST verifies the resource allocation map, but does not activate the devices.

At step 368, the POST attempts to deactivate nput and output devices, or ensure that the input and output devices are disabled. The POST then verifies that input and output devices are disabled. Any device that cannot be disabled is then allocated as an input or output device for use during the boot process. For example, ISA based VGA display adapters may not be capable of being disabled. The POST then determines whether additional input and output devices are necessary to boot an operating system. Any devices determined to be enabled by the POST are then activated, and any Plug-and-Play device ROMs associated with the devices is called as initialization code and executed.

The configuration of each device is written to the device, and stored in a device configuration register. The Plug-and-Play ROMs initialization routine reads the device configuration register of each device in the system to determine the base IO address assigned to the device register set by the configuration software. Once the base IO address is known, a series of IO writes to the device register set may be performed to set the device up for normal operation. However, for an interrupt driven Plug-and-Play device with programmable interrupt line selection and a device specific interrupt service routine in the ROM, the device initialization code writes the start address of the interrupt service routine into the appropriate interrupt table entry; the ROM based initialization routine therefore examines its device configuration registers and determines which interrupt line has been assigned to its device.

At step 370, all devices in the system 10 are activated. Any devices thus activated having option ROMs but have not been iniialized, are initialized according to the option ROM A double check is performed to determine whether any Plug-and-Play ISA devices have been activated but not initialized, and if any such ISA devices are found and have option ROMs corresponding thereto, the option ROMs are read for initialization code which is then executed. All devices in the system 10 are checked for device ROMs and are initialized from the device ROMs. The device ROM is synonymous with the option ROM.

Referring again to FIG. 2, the POST boots the operating system, typically from a system ROM 116. At step 372, the BIOS POST executes an "INT 19h" instruction, performing the bootstrap loader program that attempts to read the operating system into memory.

At step 374, the software selects an operating system, and prepares to boot the selected operating system. If the particular operating system to be booted is plug-and-play compatib and the IPL ("initial program load") devices are configured, then the operating system is booted. The POST BIOS typically only configures the mass storage device in which the operating system resides, and may additionally enable an input and output device. Otherwise, additional devices necessary for the particular operating system may be required to be activated; the BIOS POST activates and enables every device in the system At step 376, the operating system is booted and obtains control of the machine.

Referring again to FIG. 2, the POST boots the operating system, typically from a system ROM 116. At step 372, the BIOS POST executes an "INT 19h" instruction, performing the bootstrap loader program that attempts to read the operating system into memory.

1.2 PERIPHERAL INTERRUPT CONTROLLER

The present invention operates with a peripheral interrupt controller 160 that is either an 8259A programmable interrupt controller (8259A PIC) 160a an advanced peripheral interrupt controller (APIC) 160b, or other device if desired. Each of these peripheral interrupt controllers 160 is now described in detail.

1.2.1 THE 8259A PERIPHERAL INTERRUPT CONTROLLER

Referring now to FIG. 5, an Intel® Model 8259A programmable interrupt controller 160a of the known type is shown in greater detail. As shown in FIG. 5, the 8259A typically is available in either a dip (dual in-line package) or a plastic leaded chip carrier PLCC) package type. Typically, the 8259A programmable interrupt controller 160a is cascaded in AT-mpatible systems with a second 8259A progrmable interrupt controller 160a, identical in structwur to the first, forming a master-slave interrupt controller structure. In other systems, pins 12, 13, and 15 may be used to cascade up to eight slave prograrmmable peripheral interrupt controllers from one master programmable peripheral interrupt controller. Because each of these devices is identical in structure, only one such device is shown in FIG. 5. The CAS0 pin 224, the CAS1 pin 226, and the CAS2 pin 230 allows selection of the slave prograrmmable peripheral interrupt controller 160. The programmable interrupt controller shown in FIG. 5 may be used for either the master or the slave device. Various pins allow the programmable interrupt controller 160a to be set to operate as either a master or as a slave.

1.2.1.1 THE INTERRUPT REQUEST PINS

In the PLCC package, the CAS0 pin 224a, the CAS1 pin 226a, and the CAS2 pin 230a operate as the corresponding pins in the DIP package.

Eight interrupts, IR0–IR7, configured on IRQ status-bit pins 236–250, are connected to the peripherals (for example, devices 412, 414 and 416) which may request an interrupt. Where edge (i.e., unshrable) interrupts are used, only one IRQ status-bit pin may be connected to each peripheral. In the 8259Acompatible system, the hardware interrupts are active high, and may be prioritized according to pin number. The 8259A programmable interrupt controller 160a may be prograamed to operate in either a slave mode or a master mode via a pin 232 for this purpose. An output INT pin 234 connects to the INTR input of the central processing unit 100, typically directly, to indicate to the central processing unit 100 when an interrupt has occurred.

Data Pins 208–222 provide a connection to the data bus 102a. Over these pins, the 8259A peripheral interrupt controller provides the central processing unit 100 with the interrupt handler number corresponding to the asserted interrupt of highest priority, and allows the central processing unit 100 to program the 8259A peripheral interrupt controller 160a.

The CAS0 pin 224, the CAS1 pin 226, and the CAS2 pin 230 allow selection of the slave 8259A Peripheral Interrupt Controller 160a, when several slave 8259A peripheral interrupt controllers are cascaded from a master 8259A peripheral interrupt controller 160a. Since up to eight slave 8259A peripheral interrupt controllers 160a may be thus cascaded, the CAS0 pin 224, the CAS1 pin 226, and the CAS2 pin 230 operate as a three-bit chip select.

The INT pin 234 provides a "summary" signal or logical "OR" to the central processing unit 100 indicating that at least one device connected to the 8259A peripheral interrupt controller 160a has asserted an interrupt request. In response to assertion INT pin 234, the INTA* pin 250 provides a connection from the central processing unit 100, indicating that the central processing unit 100 has acknowledged the interrupt request.

The GND pin 228 and the Vcc pin 254 provide power supply to the 8259A peripheral interrupt controller 160a. When not in "buffered mode," the SP*/EN pin 232 indicates whether the 8259A peripheral interrupt controller 160 is a master or a slave.

1.2.1.2 THE INTERRUPTED REQUEST REGISTER

The 8259A peripheral interrupt controller 160a contas an interrupt request register (IRR) 262, having a bit corresponding to each IRQ status-bit pin 236–250. Thus, when a peripheral device asserts an interrupt signal to the 8259A programmable peripheral interrupt controller, raising the voltage on the corresponding IRS status-bit pin to a high level, the in-service register 266 sets the corresponding in-service register bit to a 1. Multiple devices may therefore assert interrupts to the 8259A programnable interrupt controller simltaneously. When the valuein the interrupt request register 262 indicates that an interrupt signal has been asserted from at least one device, i.e., that a voltage on an interrupt pin 236–250 is at a high level, the INT signal on INT pin 234 is asserted to the central processing unit 100. Upon an interrupt acknowledge sequence from the central processing unit 100 via INTA*pin 252, enabled status bits are transferred in order of priority from the interrupt request register 262 to the in-service register 266 via a priority resolver 264. The programmable interrupt controller 160a may be programmed with priorities. When transferred, a bit is cleared in the interrupt request register 262, allowing the device coupled to the corresponding pin to assert a subsequent interrupt. The priority resolver 264 allows interrupts to be handled in a logical sequence when multiple devices assert interrupt requests concurrently.

1.2.1.3 THE IN SERVICE REGISTER (ISR) AND THE PRIORITY RESOLVER

Upon the assertion of an interrupt-acknowledge INTA*signal on the INTA*pin 252 from the processor, the in-service register 266 provides an 8-bit number to the data bus via data pins 208–222. The 8-bit number provided by the in service register 266 corresponds to the mnmber of the interrupt handler corresponding to the particular interrupt request, and therefore does not specifically indicate the interrupt number. Thus, the 8259A programmable interrupt controller 160a can be programmed to map any of the interrupts on IRQ status-bit pins 236–250 to any of the 256 interrupt requests identifiable by an 8-bit number provided by the in-service register 266.

In summary, when an IRQ line coupled to one of the IRQ status-bit pins 236–250 is asserted high, an 8-bit number indicating which of the IRQ status-bit pins is asserted is stored in the interrupt request register 262. The INT signal on pin 234 is asserted to the ceral proessing unit 100, which responds (if the interrupt enable, flag in the central processing unit 100 is set) by asserting low a signal to the INTA pin*252 pin in the 8259A programmable interrupt controller 106a. The programmable interrupt controller 160a also stores pointers to interrupt handlers. The central processing unit 100 asserts the signal on the INTA pin***252 twice by driving the voltage on the pin low on two successive clock cycles. Upon the first such assertion of the INTA*pin 252, the value in the interrupt request register 262 is transferred to the in-service register 266, and upon the second assertion low of the INTA*pin 252, a pointer to the interrupt handler is provided on the data bus via pins 208–222.

1.2.1.4 THE INTERRUPT MASK REGISTER

The 8259A programmable interrupt controller 160*a* also has additional logic for programming offset mnmbers to each interrupt handler. By storing the offset value corresponding to each associated interrupt handler, the 8259A programmable interrupt controller 160*a* can provide the appropriate offset for each interrupt.

When cascaded, the status-bit IRQ2 (pin 240) of a first programmable interrupt controller 160*a* is connected directly to the INT pin 234 of a second (slave) 8259A programmable interrupt controller. When cascaded, the summary INT pin 234 of the master is connected to the INTh input (not shown) of the central processor unit 100, and the acknowledge INTA*pin 252 of the master is coupled to receive an interrupt-acknowledge INTA*pulse from the central processor unit 100, as in the uncascaded 8259A programmable interrupt controller 160*a*. Other pins, including pin 202, Vcc pin 254, and data pins 208–222 of the master 8259A programmable interrupt controller are connected as in an uncascaded 8259A programmable interrupt controller 160*a*. Also, the CAS0 pin 224, the CAS1 pin 226, and the CAS2 pin 230 ofthe master and slave programmable interrupt controllers 160*a* are connected together A master programmable interrupt controller 160*a* drives a voltage on these pins, while a slave is enabled by a particular programmable conibination. The master 8259A prograable interrupt controller 160*a* receives a high voltage at pin 232, and the slave 8259A programmable interrupt controller 160*a* receives a low voltage at pin 232. When multiple slave 8259A programmable interrupt controllers 160*a* are cascaded from the same master, each may be regarded as having an address identified by the CAS0 pin 224, the CAS1 pin 226, and the CAS2 pin 230. Although in the priority resolver 264 of the master, all interrupts received from the slave via IRQ status-bit IRQ2 240 have the same priority, at least with respect to other interrupt requests received directly by the master, the cascaded 8259A progrmimable interrupt controller 160*a* operates as a unified programmable peripheral interrupt controller 160*a* as seen by the central processing unit 100.

A select mask register 490 allows rotation among interrupts assigned equal priority in the priority resolver 264, and also allow masldng of interrupts. The data bus buffer 270 is a three-state bi-directional eight-bit buffer, used to interface the 8259A programmable interrupt controller 160*a* to the system data bus 102*a*. Control words and status information are transferred through the data bus buffer 270. The read/write logic 272 contains initialization command word registers and operation command word registers, storing control fornats for device operation. The read/write logic 272 also allows the status of the programmable interrupt controller 160*a* to be transferred onto the data bus 102*a*. It also accepts OUT commands from the central processing unit 100. The cascade buffer/comparator 274 stores and compares the identifiers which are unique for a particular programmable interrupt controller 160*a*, from among all the programmable interrupt controllers 160*a* in the system 10. When the pin 232 is high, indicating the progranunable internupt controller 160*a* is a master, the chip identifier is readable on the CAS0 pin 224, CAS1 pin 226, and CAS2 pin 230. When the pin 232 is low, indicating the programmable interrupt controller 160*a* is a slave, the enabling identifier of the desired chip is read into each chip on these pin&. Thus, slave programmable interrupt controllers 160*a* are selectable by the master using these three pins.

1.2.2 THE ADVANCED PERIPHERAL INTERRUPT CONTROLLER

Figure 6:
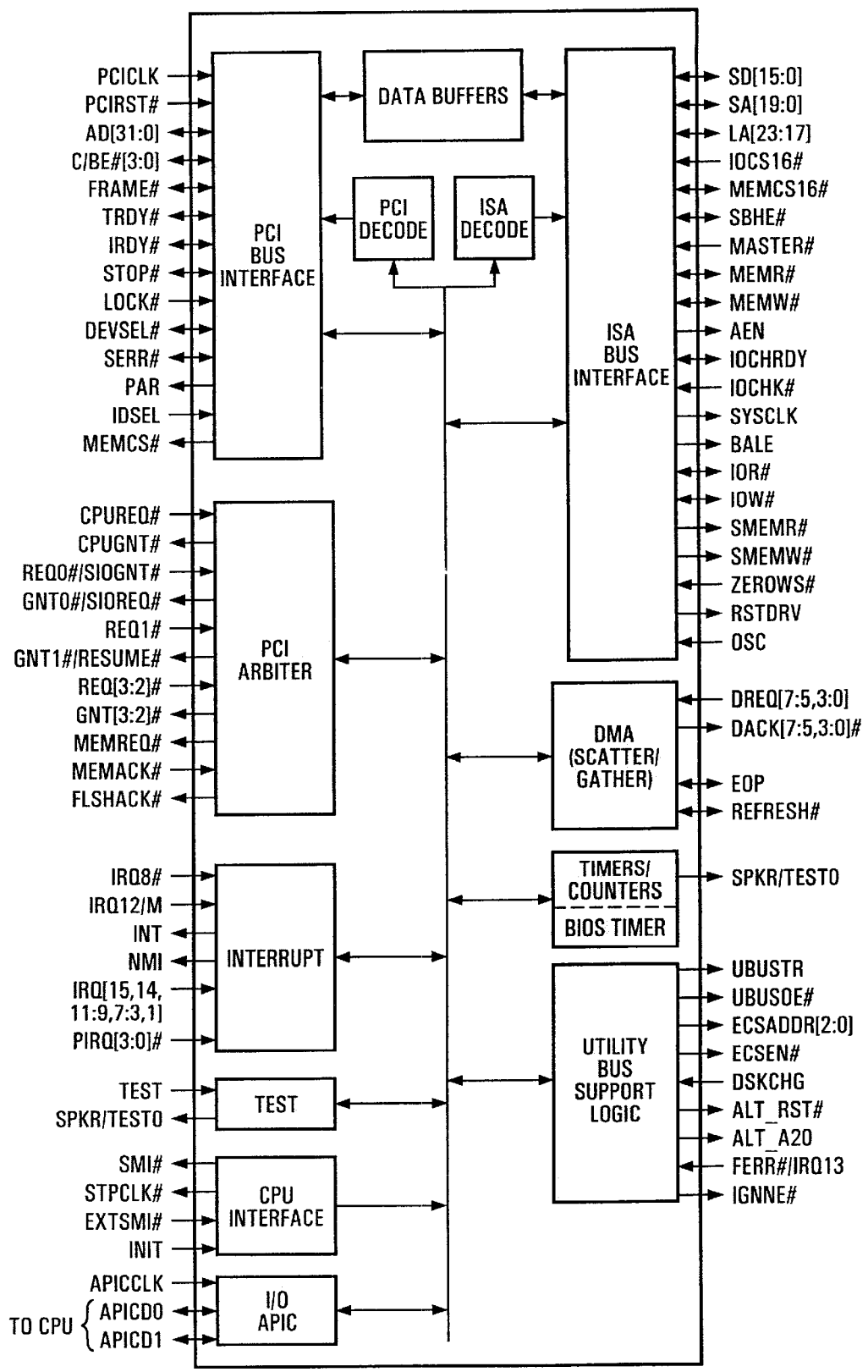
FIG. 6 shows a schematic circuit diagram of an advanced form of conventional peripheral interrupt controller.

Referring now to FIG. 6, an alternative to the 8259A programmable interrupt controller 160*a* is an advanced programmable interrupt controller, the APIC. The Advanced Peripheral Interrupt Controller 160*b* is, typically, used in a multiprocessor system allowing interrupt sources to be handled by any of a number of processors in the system 10. Each APIC 106*b* or "local interrupt unit" is coupled to corresponding central processing unit such as central processing unit 100, and is also coupled to anuber of interrupt sources such as a peripheral devices. A number of PCI bus features, shown at the left side of FIG. 6, are interfaced with the corresponding features of the ISA bus. Thus, in addition to interfacing with the central processing unit 100, the Advanced Peripheral Interrupt Controller 160*b* can also interfiace with both a PCI bus and an ISA bus.

An Advanced Peripheral Interrupt Controller 160*b* is a local interrupt unit connected to a central processing unit. The local interrupt unit or APIC 160*b* is also connected to a number of devices. Two of the interrupts in the local interrupt unit are dedicated to the particular central processing unit 100. However, other interrupts connected to the local interrupt unit may be redirected via an interrupt control unit to the local interrupt unit of whatever processor in the system is not currently running a higher priority interrupt handler. Signals generated by the two dedicated interrupts are always handled by the connected central processing unit. However, other interrupts may be transferred to and handled by any other central processing unit in the system 10. Thus, each interrupt is redirected to a processor that is either not running an interrupt handler or running an interrupt handler of a lower priority interrupt. The Advanced Peripheral Interrupt Controller 160*b*, also includes an ICC bus and various arbitration and messaging logic. In this way, including interrupts received by the redirection from other APIC's, the Advanced Peripheral Interrupt Controller 160*b* provides an almost unlimited nurmber of interrupts to central processing unit 100, since other microprocessors having corresponding APICs may be added to the system, and each processor must thereafter be able to handle interrupts connected to the additional APICs.

1.3 PERIPHERAL DEVICES

As can be seen with reference to FIG. 3, because each device configured according to the plug and play isolation methodology according to the serial identifier of each card, a system configured having the same cards will always configure to the same configuration In other words, by examining the serial identifier of each card in the system, one can predict the configuration of the device. The serial identifiers are determined by the manufacturer of the device, and are not alterable by the user.

Moreover, because the 8259A programmable interrupt controller 160*a* has a finite number of interrupt request pins, e.g., interrupt request IRQ status-bit pins 236 through 250, the number of peripheral devices which may be configured in a given system according to the plug and play system architecture is limited by the number of pins available on the 8259A programmable interrupt controller 160*a*. It for example, the programmable interrupt controller 160 is limited to at most fifteen possible interrupts (as in the case of a master and a slave 8259A programmable interrupt controller 160a cascaded), and sixteen peripheral devices are coupled to the system, the sixteenth device will not be configurable, and will be invisible to the system, as the first fifteen devices having the lowest numerical value in the respective serial identifiers wil be configured by the plug and play isolation methodology.

Other problems arise when the peripheral interrupt controller 160 is an APIC 160b. Although, the APIC 160b may connect to a virtually unlimited number of interrupt request lines, many devices themselves provide limitations. For example, many devices are configured only to the first 16 interrupt request lines. If an interrupt request line beyond the first sixteen is an assigned to such a device, the device does not respond. The device is, in effect, unconfigured. If device 416 is such a device, then the device 416 should not be assigned an interrupt request line beyond the first 16. If at least sixteen other devices in the system 10 have numerically lower card select numbers (CSN), some or all may be configurable to any of the first 32 interrupt request lines. For example, device 412 may be configurable to any of the first 32 interrupt request lines, and may have a numerically lower card select number than device 416. Plug-and-Play therefore configures device 412 before 416, even though device 412 is more flexible in configurability. It may occur that the device having card select numbers numerically lower than that of device 416 receive interrupt request lines. Consequently, although plug-and-play attempts to configure device 416, no suitable resources are available.

Accordingly, there are two approaches to substituting a desired device having a numerically high serial identifier for an undesired device having a numerically smaller serial identifier, such that the configuration software recognized a different set of peripheral devices, other than the first fifteen normally isolated and configured by the plug and play methodology. The first such method is to remove a device having a serial identifier that is numerically less than the serial identifier of a desired device from the system, by physically disconnecting the undesired device from the bus. Because the device is thus physically disconnected from the bus, the device is invisible and cannot be configured. The desired device, previously not configured, is thus; rendered visible, i.e. among the fifteen devices having the lowest serial identifier numerical value that remains coupled to a bus.

While this method, known in the prior art, is possible when the device to be removed is a peripheral device that the user can see and handle, the method is not generally recommended when the device to be removed is a motherboard device within the case of the computer itself and the user is not highly sophisticated in computer hardware. Moreover, this solution requires physical manipulation of cards, and may therefore be regarded as inelegant. After all the entire purpose of the Plug-and-Play configuration was the elimination of jumpers and switches that required sophistication and technical knowledge to reconfigure a system. Thus, the first method is unacceptable.

The second method, in accordance with the present invention, is to include a hardware enable/disable bit for each hardware device in the system. The bit may be located within a PCI configuration space, within each device, or collectively within an ID select mask register 490. Each device in the system is further provided with a switch or routine for toggling the enable/disable bit, and a corresponding memory value for storing the enableldisable state of the device, and logic for allowing the state to be transitioned upon the receiving of a signal from the central processing unit 100 via one of the buses.

Figure 7:
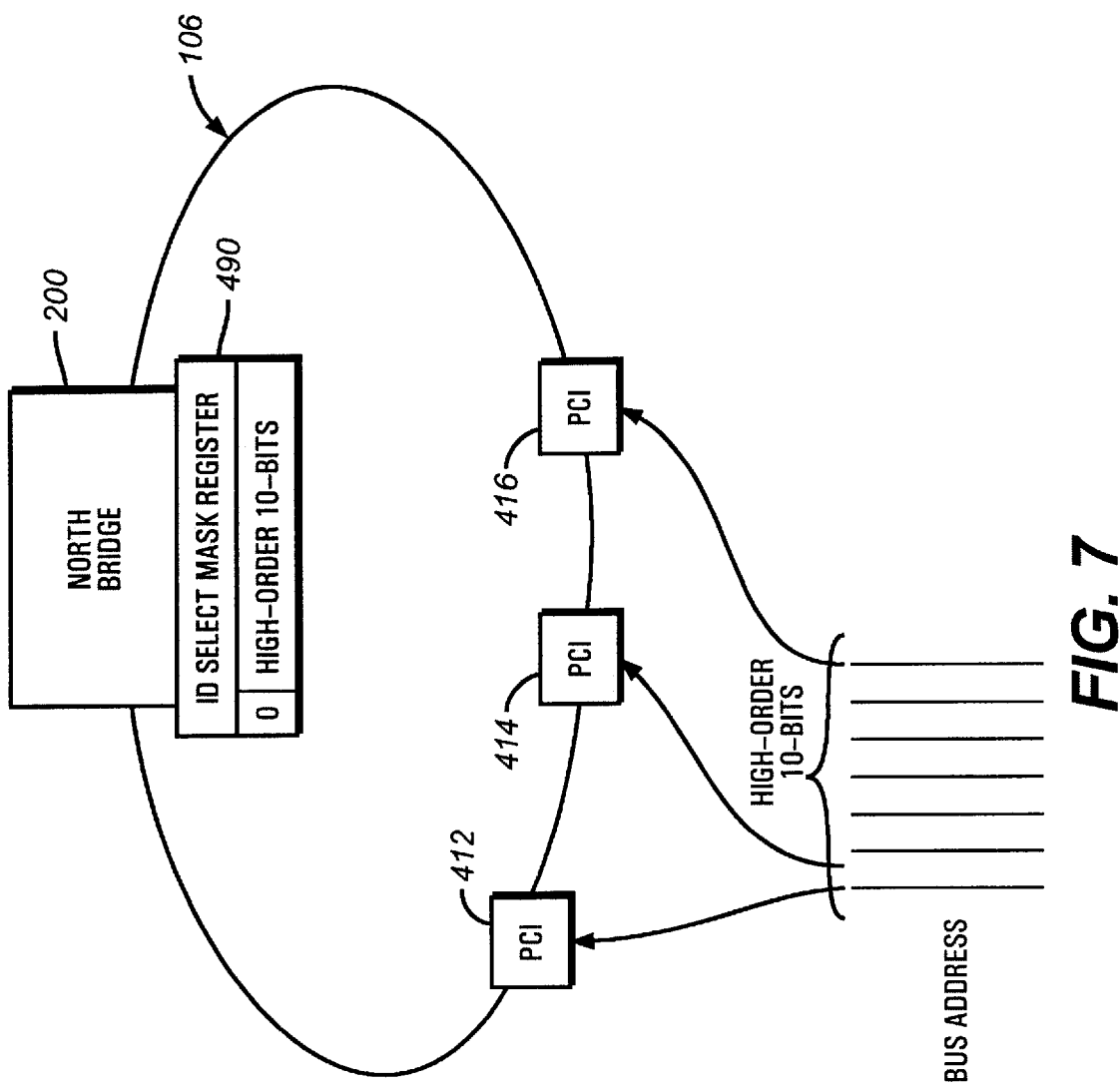
FIG. 7 shows a circuit diagram memory controller on a PCI bus operating according to the present invention.

Referring now to FIG. 7, North bridge memory controller 200 is connected to the PCI bus 106 which has several PCI devices 412, 414 and 416 also on the PCI bus 106. The North bridge memory controller 200 is also connected to an ID select mak register 490 according to the present invention. The ID select miask register 490 has 10 high order address bits that serve as an ID select mask The PCI bus 106 has an address having ten high order bits which operate to select a PCI device on the PCI bus 106.

During configuration upon power-up, the North bridge memory controller 200 asserts each of the ten high order address bits in tum, such that exactly one of the ten high order address bits is asserted at a time. Each of the address bits enables a distinct PCI slot on the PCI bus 106. A device coupled to the slot responds to the enable by providing a device signature over the PCI bus 106. Because only one of the 10 high order address bits is asserted at a time, conflicts are avoided. One or more of the PCI devices is a PCI bridge 420a to another PCI bus 106a, which has an ID select mask register 490a for the secondary bus 106a. For any given PCI bus 106 or 106a only one bit of the 10 high order bits may be asserted at any time.

Once all devices, including device 412, 414, and 416, have provided a signature, device configuration occurs. According to the plug-and-play methodology, each device is transitional into various states as described along with reference to FIGS. 2 and 3. Devices are therefore configured in the numerical sequence of the card select numbers (CSN) corresponding to each card. When the system 10 runs out of resources, for example when the system 10 has assigned all available interrupts, remaing devices may be detected but are not configurable. For example, device 412 may have a compartively low card select number and may therefore receive a resouce assignment, while device 416 may have a CSN numerically greater than that of several other devices. If device 416 has a card select number greater than that of "n" other devices, where "n" is the number of resources available in the system, then device 416 receives no resources. This is, unfortunately, unalterable by the user; even if device 416 is desired and device 412 is undesired, the user cannot configure device 416. Because, card select numbers are provided by the vendor of each card and are not user definable, plug-and-play does not provide a method for deselecting undesired devices and selecting desired devices.

Configuration, both for unmasked devices during the first configuration phase and for all yet-unconfigured devices during the second configuration phase, includes a power on self-test (POST) routine that configures the peripheral device according to a Plug-and-Play configuration. Of course, other configuration methodologies can be used. Configuration is, of course, limited by the number and availability of resources. The invention therefore is particularly useful for masking devices which would otherwise be configured before a selected device in a computer system having limited resources, to the exclusion of the selected device. By masking the devices which would otherwise be configured before the selected device, the user can preserve resources for the selected devices.

The invention is also particularly useful for masking devices that require low-numbered interrupts and other resources, but which the POST methodology configures late in the configuration. Some devices are more "robust" than others are in that they can operate with any of a wider set of resources. Other devices are less robust, and must be assigned particular resources to operate properly. When more robust devices are configured first, they may inadvertently be assigned scarce resources without which less robust devices cannot operate. Subsequently, attempts to configure the less robust devices (of limited configurability) fail.

Figure 8:
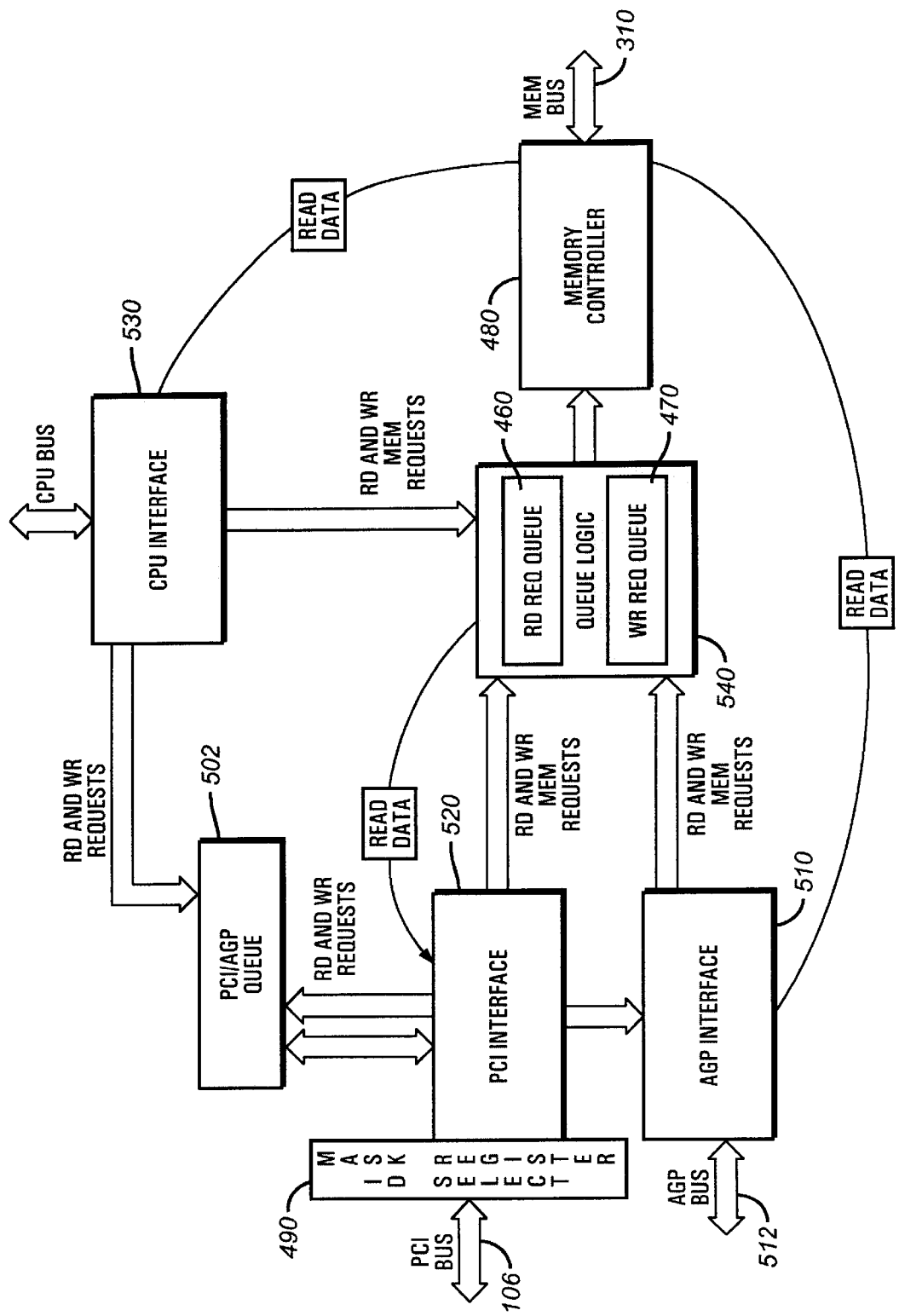
FIG. 8 shows a memory controller adapted according to the present invention.

Masking the more robust devices (ie., those devices that may use a wide range of resources) during the first phase of configuration allows the computer system to assign scarce resources to those devices of limited configuration robustness first. Then, during a second phase of configuration, the more robust devices can be configured from remaining resources Referring now to FIG. 8, the internal operation of the Northbridge memory controller 200, including an identification or ID select mask register 490 according to the present invention, is shown. FIG. 8 also shows the operation of the high order 10 bits within the ID select mask The ID select mask register 490 is coupled between the PCI bus 106 and the PCI bus interface 520 and the PCI bus 106.

The North Bridge of FIG. 8 includes a CPU interface 530, a PCI AGP queue 502, a PCI interface 520, an AGP interface 510 and queue logic 540. The queue logic 540 contains a RD (read request) queue 460, WR (write request) queue 470, a memory controller 200, and the ID select mask register 490. The North bridge memory controller 200 provides connection between the PCI bus 106, the AGP bus 512 and the memory bus 310.

The CPU interface 530 is the high speed CPU host bus 110 that has L2 cache 104. The CPU interface 530 gives cache 104 instructions via the queue logic 540. The North bridge memory controller 200 provides a bridge between four buses: the CPU bus host bus 110, the memory bus 102*a*, the PCI bus 106 and an AGP bus 512. The North bridge memory controller 200 coordinates all the transfers from a first device on any given bus to a second device on any other given bus. The memory bus also provides a data path to main memory 102. The PCI bus provides slots for receiving PCI devices including PCI bridges to other devices via other buses. The AGP bus 512 provides a path to the video card 150, which includes an AGP video adapter or AGP video controller for high-speed video.

The present invention provides software control over the ID select mask register 490 and 490*a*. Software control includes a user interface allowing the user to define a set of preferred devices. By resetting selected bits in the mask register 490, software is rendered capable of prohibiting PCI cycles from being received by the destination device or devices, for example device 412 that is undesired during a particular session during the first of two configuration stages. Thus, the software control enables a two-phase configuration Each phase proceeds according the plug-and-play methodology set for in reference to FIGS. 2 and 3. However, each phase is performed on a different subset of the available devices. During the first phase, all PCI devices except the set of preferred devices are masked (i.e., disabled) within the mask register 490. Devices are configured normally, according to a plug-and-play or other configuration scheme. Thereafter, all devices are unasked by setting bits in the mask register 490. The system then configured devices again, during a second phase, assigning resources to devices which have not yet received resources.

The software control writes a value to the ID register 490 that includes a "one" for each device to be enabled and a "zero" for each device to be disabled during the first configuration step. The ID select mask register 490 is connected to the PCI interface 520, and in particular to an input/output port. The central processing unit 100 performs an I/O read or an I/O write to the input/output pon of the ID select mask register 490. It will be recognized that, although described as residing internally to the memory controller, the ID select mask register 490 may be a separated structure configured to intercept signals between the memory controller and the PCI bus 106.

The present invention also ensures that all available interrupts are used. During the first configuration phase, the mask register 490 disables or "hides" devices that would, under normal plug-and-play configuration rules, be configured before, and to the exclusion of, one or more of the preferred devices. For example, device 412 may be disabled during the first phase. Software control allows a user to turn off some existing device that is capable of using an APIC interrupt, to reconfigure the system to include a preferred device that would have been excluded during Plug-and-Play configuration, and to allow the preferred or desired device to use the legacy interrupt that the previous device had been using. If device 412 is disabled during the first phase, resources are assigned to other devices including device 416. Subsequently, i.e. during the second phase, when the system identifies remaining assignable resources and unconfigured devices, software control unmasks device 412 and reconfigures the system again to reconfigure the device.

With respect to a peripheral interrupt controller 160 with a limited number of resources, such as the 8259A programmable interrupt controller 160*a* which has only a finite number of IRQ status-bit pins 236–250 for connecting via interrupt request lines to devices, the ID select mask register 490 and the two-phase configuration process provides a solution to selecting devices. With respect to the APIC 160*b*, however, which can connect to an unlimited number of devices provided sufficient numbers of local interrupt units are present other benefits may be realized. For example, many devices cannot provide interrupts except on the first 16 interrupt request lines connected to IRQ statubit pins 236–250. Other devices can provide interrupt on any of the first 32 interrupt request lines. When the peripheral interrupt controller 160 is an APIC 160*b*, and devices configurable to any of the first 32 interrupt request lines have a numerically lower card select number than another device configurable only to the first 16 interrupt request lines, plug-and-play may configure the former to the exclusion of the latter. The present invention provides a solution to this problem by allowing the system to "hide" the devices configurable to 32 interrupt request lines during the first phase. Thus, all devices configurable to only 16 interrupt request lines are configured during the first phase. Plug-and-Play identifies each device as configurable to only 16 interrupt request lines, recognizes that none of the first 16 interrupt lines have been assigned to devices, and configures devices by assigning some or all of the first 16 interrupt request lines to the "visible" devices Thereafter, during the second configuration phase, the devices capable of assignment to interrupt request lines beyond the first 16 are unmasked and configured. The plug-and-play process proceeds as indicated in FIGS. 2 and 3 with respect to yet-unconfigured devices, including those that were masked during the first phase The reconfigured device 412 is able to use some higher numbered APIC interrupt and for APIC aware Plug-and-Play operating systems, a device is added. For legacy operating systems, one device has been exchanged for another, by means of the invention.

In a second embodiment, software control over the masldng of devices during Plug-and-Play configuration is performed purely in software, within an operating system or within a routine accessible to the operating system. Thus, mask register 490 is eliminated. According to the second embodiment, an extended system configuration data (ESCD) storage medium or other configuration storage medium allows the BIOS to reboot from a legacy device configuration. By running a Plug-and-Play operating system, the software changes the configuration of the device within the medium. That new configuration thereafter becomes the legacy OS configuration within the Windows 95 or other Plug-and-Play operating systems, and the software is able to write back to ESCD storage (a nonvolatile storage). The next time the system boots, that device is configured to match the new setting in the ESCD table. The present invention over-writes the ESCD table dynamically. Moreover, the present invention configures PCI devices. Finally, the present invention provides a solution to the problem of having so many devices that some cannot be configured.

Achieving configuration of otherwise-unconfigured devices is far from the only benefit of the present invention. For example, a computer system 10 maybe operating slowly because a secondary bus matter is monopolizing the PCI bus 106. Alternatively, the computer system 10 may be operating slowly because other systems in a network of computer systems are sending tasks to the central processing unit 100 of computer system 10 for parallel processing. Thus, the present invention allows a user to disable the secondary bus master or a network interface card (NIC), like device 412 of previous example, to allow the computer system 10 to operate more quickly. Thus, the present invention allows a user to "hide" or disable undesired devices during all phases of configuration, even the second phase. An example is helpful to understanding the present invention In the example, a computer system 10 within a network is running under Windows 95. Unfortunately, due to network latency caused by other users on the network, the computer system 10 runs very slowly. The user desires to edit a document without accessing the network. To address the problem according to the invention, the user accesses a list of all the hardware on the system 10. The list of devices initially includes a network adapter. A selection of the network adapter (and other devices) is performed via a user interface according to the present invention. The user examines the list and identifies the network adapter or other undesired device for disabling. If desired, the list may include an indication of burden on the central processing unit 10, organized by task and device. The user then restarts the system 10 or otherwise indicates that the system 10 is to be reconfigured (statically or dynamically). The system 10 resets the bit in the register 490 to disable the adaptor. The next time the system reboots, the network adapter (and any other selected devices) are ignored during Plug-and-Play configuration.

Thus, the present invention includes software programmability of the ID select mask register 490 in the system 10. When PCI configuration software on the central processing unit 100 issues a bus configuration cycle to obtain device signature for the up-to-ten PCI devices on the PCI bus 106, the device responds because the device is physically there. However, the configuration software of the present invention includes a higher order software mechanism according to the invention that determines whether the device should be enabled to respond. The software mechanism then hides the device from the Plug-and-Play configuration process. The order in which configuration takes place remains the same, but orgy devices unmasked by the ID select register receive resources during the configuration process. The configuration software then determines whether any masked devices should be unmasked. If so, the configuration software unmasks the devices and re-initiates the plug-and-play BIOS routines that configure unmasked devices.

The second embodiment, i.e., a software implementation of the ID select mask register 490 is implemented as an application or other piece of software accessed by the operating system that allows a user to indicate some devices that should be excluded from the configuration. The software is executed before the Plug-and-Play configuration of the devices. The software provides a filtering mechanism selectively granting permission for the Plug-and-Play BIOS to enable each device. Controlling the order in which the devices are configured determines which devices are configured.

Figure 9:
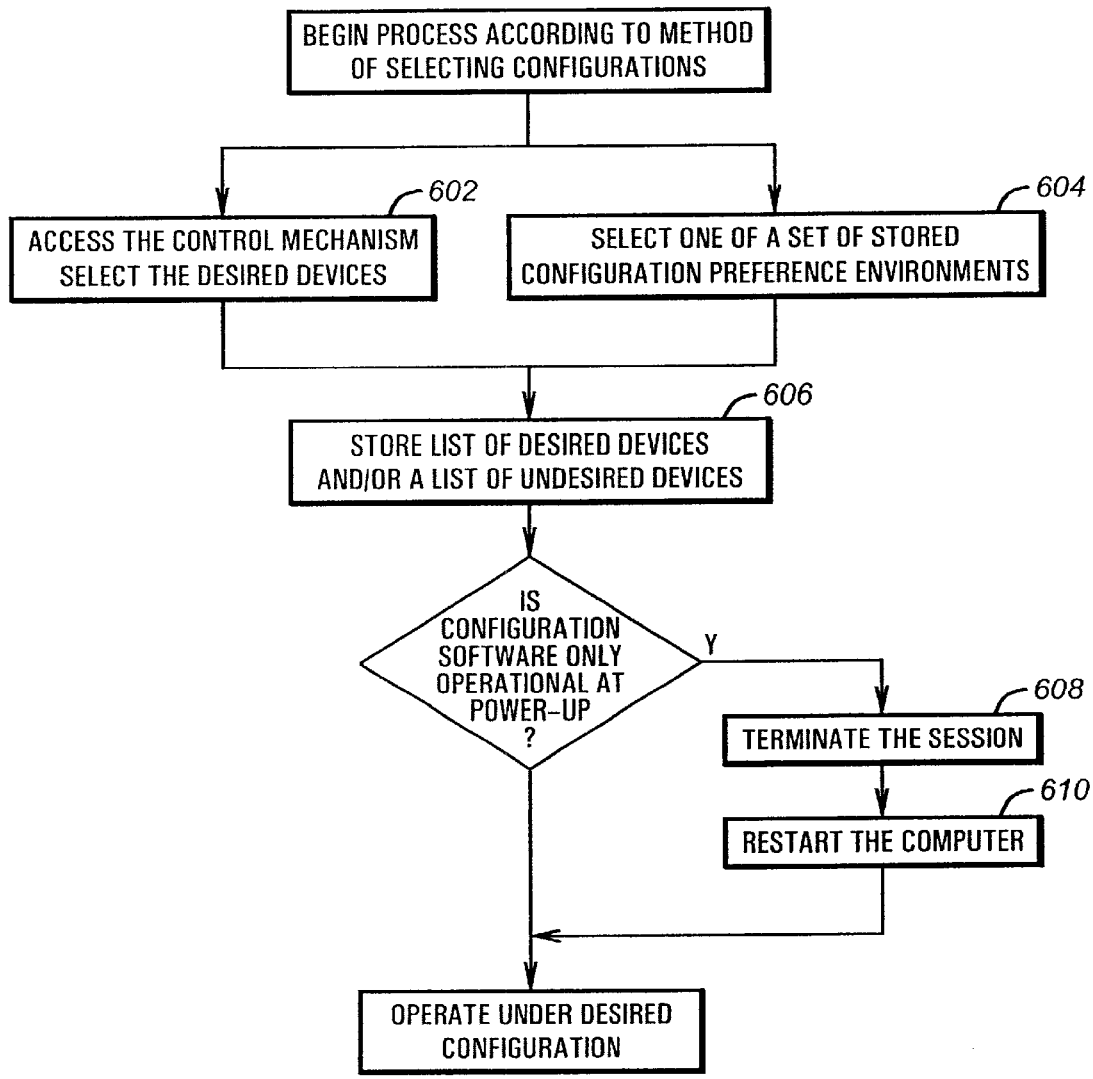
FIG. 9 shows a flow chart of a Power-On Self Test ("POST") process, according to the present invention.

Thus, the computer system includes a configurable peripheral device coupled to the PCI bus 106, and a programmable select mask register 490 for selectably masking the peripheral device. The programmable select mask register 490 prevent configuration of the peripheral device during the first configuration phase when the peripheral device is masked, but permits configuration of the peripheral during the first configuration phase when the peripheral device is unmasked. Referring now to FIG. 9, a modified plug-and-play control mechanism according to the present invention is shown The configuration routines including the control mechanism are stored in a storage device, preferably the system ROM 116. The configuration routines include a set of instructions for configuring the configurable peripheral device during the first configuration phase, when the peripheral device is unmasked. The configuration routines also include a set of instructions for configuring the configurable peripheral device during the second configuration phase, when the peripheral device is unconfigured by the first configuration phase. The only effect of the mask is to prevent configuration of the peripheral device during the first configuration phase; the mask may or may not be ignored during the second configuration phase.

At step 602, during run-time, a user accesses the control mechanism to indicate to the system 10 what devices are desired and what devices are undesired. Step 62 initiates a user interface routine. The computer system has a user interface, for allowing a user to selectively mask and unmask the peripheral device. The computer system user interface has a number of routines for allowing the user to exchange information about the desired configurations. The routines also allow the user to store configuration states, having lists of desired devices, that are either to be masked or unmasked during the first phase of configuration. At step 604, the user indicates which devices are desired and which are undesired. Alternatively, at step 604, the user selects one of a set of stored configuration preference environments.

At step 606, the computer system 10 stores a list of desired devices and/or a list of undesired devices. The list of desired devices may be stored by setting nonvolatile memory bits within the ID select mask register of 490. Alternately, if desired, the list may be stored in PCI configuration space. Rather than having a physical structure such as a mask register 490, or a memory controller with an ID select mask register 490, the alternate embodiment proceeds through the use of the PCI configuration space. The PCI configuration space is a region of memory and registers that stored information about devices on a PCI bus 106. PCI bridges may also have configuration spaces, for storing information about secondary PCI buses such as PCI bus 106.

The programmable select mask includes a routine for altering a region within a PCI configuration space corresponding to a device that is to be masked during a first phase of configuration. The software routine allows alteration of the PCI configuration space corresponding to many or even all devices to be masked during the first phase of config on.

Several techniques for storing the list of undesired devices in the PCI configuration space are available. If desired, the routine assigns inconsistent resources to the peripheral device when the device is masked, preventing configuration of the device during a first configuration phase. The peripheral device has a device type identified within the PCI configuration space corresponding to the device. The programmable select mask routine assigns resources to the peripheral device that are incompatible with the device type when the device is masked. When the operating system detects that the device has a device type that is incompatible with the assigned resources, rather than generating an interrupt or attempting to find a compatible resources, the configuration routine (during a first phase) may opt to "skip" the device. The configuration routine proceeds to the next device.

If desired, rather than assigning a resource that is incompatible with the device type, the routine can identify a device driver that is incompatible with the device type. As stated, the device type corresponding to the device is identified within the PCI configuration space. When the device is masked, the programmable select mask routine may assign a device driver to the peripheral device that is incompatible with the device type, preventing a conflicting configuration of the device during the first configuration phase. When the operating system detects that the device has a device type that is incompatible with the assigned driver, rather than generating an interrupt or attempting to find a compatible driver, the configuration routine (during a first phase) may opt to skip the device. The configuration routine proceeds to the next device.

However, many system designers prefer to have error-handling functions that solve incompatibilty of device type and either the resource list or the driver description, corresponding to the device. Often, when drivers are unavailable, other drivers will work almost as well. Secondary resources, also, can be assigned to many devices when preferred resources are not available. For example, if a ligh-speed modem is not available, many computer systems are able to find whether a lower-speed modem is available and can load the appropriate driver. In such systems, designers may not desire to replace such error-handling routines. Consequently, in such systems it may be more advisable to redundantly assign multiple identical resource identifiers to the peripheral device, rather than incompatible resources or incompatible drivers. The first configuration phase can detect a redundancy and prevent configuration of the device during the first configuration phase. The configuration routine es the configuration space, detenrines whether a resource is included twice (or more than twice) for the same device, and if so skips the device during the first phase of configuration.

Still another approach may be desired. In some systems, when a device is to be masked, the programmable select mask routine may assign a device type of a non-memory device to the device and further assigning a memory descriptor to the device, within the configuration space. The incompatibility of the memory descriptors and a non-memory device type indicates an error. Rather than branching to an error-handling subroutine, however, the present invention may merely skip the device. The device is not assigned resources during the first phase. Thus, the mask is completely within the configuration space of the device, and needs no hardware implementation at all.

Still another approach is to include a vector pointing to a non-executable instruction. Often, routines include control branches to various locations in memory. When a computer program encounters a branch statement, control transfers to a different area of memory; however, control proceeds normally. The branch statement normally includes a pointer to the new memory location where control is to be transferred. Another example of pointers is in relation to linked lists. Also, linked lists are often included in memory. Linked lists include pointers to other areas of memory, where the list continues.

The latter approach is to enter a vector that is not meaningful in the context of computer execution flow. The vector may point to a memory location that is not executable, or may point to a memory location that is invalid, or stores data rather than instructions, or is outside the range of memory locations. The pointer may attempt to read from a non-memory address within the I/O space of the computer, or attempt to write to a non-writing device such as a mouse. Such erroneous insructions, when encountered during run-time operation of the computer system, may cause a computer to "crash." During POST, however, they can prevent the computer from booting.

According to the present invention, however, such "errors" do not prevent successful booting of the computer system. Rather, the errors may cause the configuration routine to skip the device.

Many other "erroneous" states will now be apparent to one sklfled in the art upon examination of the disclosed invention. Various states of configurability, rather than causing control to branch to an error-handling routine or causing a computer to crash, now cause the configuration routine to skip the device and proceed to the next device. Thus, devices that would not be configured because other devices received resources first are now configurable.

Once the desired configuration is stored at step 606, the user termates the session. Terminating the session is necessary where the configuration software is only operational at power-up. Where dynamic reconfiguration is possible, steps 608 and 610 are omitted. The user may log-out and power-down, at step 608, at step 610 the user then restarts the computer. The computer configures to the desired state.

The foregoing disclosure and description of the invention are ilustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system, having:

a processor;

a bus, coupled to the processor;

a configurable peripheral device, coupled to the bus; and a programmable select mask for selectable masking of a peripheral device, the programmable select mask preventing configuration of the peripheral device during a first configuration phase when the peripheral device is masked and permitting configuration of the peripheral device during a second configuration phase.

2. The computer system of claim 1, wherein:

the peripheral device is coupled to the bus, and the programmable select mask is a programmable select mask register.

3. The computer system of claim 1, further comprising:

a memory controller, wherein the memory controller is coupled between the programmable select mask and the bus.

4. The computer system of claim 1, further comprising:

a storage device having a set of instructions that when performed by the processor when the peripheral device is unmasked configures the configurable peripheral device during the first configuration phase, and then when the peripheral device is unconfigured by the first configuration phase configures the configurable peripheral device during the second configuration phase, the programmable select mask coupled to prevent configuration of the peripheral device during the first configuration phase.

5. The computer system of claim 1, wherein the programmable select mask is a programmable select mask register.

6. The computer system of claim 1, further comprising:
a storage device having a first configuration set of instructions, executable by the processor, that when performed by the processor when the peripheral device is unmasked configure the configurable peripheral device during the first configuration phase, and when performed by the processor when the peripheral device is masked do not configure the configurable peripheral device during the first configuration phase.

7. The computer system of claim 6, wherein the storage device further comprises:
a second configuration phase set of instructions, executable by the processor, that when performed by the processor when the peripheral device is unconfigured, configure the peripheral device during the second configuration phase, if the peripheral device is unmasked prior to the second phase.

8. The computer system of claim 6, wherein:
the set of inructions further includes a power on self-test (POST) routine that configures the peripheral device according to a Plug-and-Play configuration.

9. The computer system of claim 1, further comprising:
a user interface, for allowing a user to selectively mask and unmask the peripheral device.

10. A computer system, having:
a processor;
a bus, coupled to the processor;
a configurable peripheral device, coupled to the bus; and
a programmable select mask for selectable masking of a peripheral device, the programmable select mask preventing configuration of the peripheral device during a first configuration phase when the peripheral device is masked and permitting configuration of the peripheral device during the first configuration phase when the peripheral is unmasked, the programmable select mask including a routine for altering a region within a PCI configuration space corresponding to the device.

11. The computer system of claim 10, wherein:
the programmable select mask routine assigns inconsistent resources to the peripheral device when the device is masked, preventing configuration of the device during the first configuration phase.

12. The computer system of claim 11, wherein:
the peripheral device has a device type identified within the PCI configuration space corresponding to the device; and
the programmable select mask routine assigns resources to the peripheral device that are incompatible with the device type when the device is masked.

13. The computer system of claim 12, wherein:
when the device is masked, the programmable select mask routine assigns a device type of a non-memory device to the device and further assigning a memory descriptor to the device, within the configuration space.

14. The computer system of claim 11, wherein:
the peripheral device has a device type identified within the PCI configuration space corresponding to the device; and when the device is masked, the programmable select mask routine assigns resources to the peripheral device that are incompatible with the device type, preventing configuration of the device during the first configuration phase.

15. The computer system of claim 11, wherein:
the peripheral device has a device type identified within the PCI configuration space corresponding to the device; and
when the device is masked, the programmable select mask routine assigns a device driver to the peripheral device that is incompatible with the device type, preventing configuration of the device during the first configuration phase.

16. The computer system of claim 11, wherein:
when the device is masked, the programmable select mask routine redundantly assigns at least two identical resource identifiers to the peripheral device, such that the first configuration phase can detect a redundancy and prevent configuration of the device during the first configuration phase.

17. The computer system of claim 11, wherein:
at least two identical resource identifiers to the peripheral device, such that the first configuration phase can detect a redundancy and prevent configuration of the device during the first configuration phase.

18. The computer system of claim 11, wherein:
the region within a PCI configuration space corresponding to the peripheral device includes a vector pointing to a non-executable instruction.

19. The computer system of claim 11, wherein:
the region within a PCI configuration space corresponding to the peripheral device includes a vector pointing of zero.

20. The computer system of claim 11, wherein:
the region within the PCI configuration space corresponding to the peripheral device includes a bit that when set indicates that the peripheral device is not configurable during the first configuration phase.

21. In a computer system having a processor, a bus coupled to the processor, and a configurable peripheral device coupled to the bus, a programmable select mask register, the programmable select mask register comprising:
a mask indicator corresponding to the peripheral device, the mask indicator for selectably masking the peripheral device, the programmable select mask register preventing configuration of the peripheral device during a first configuration phase when the a peripheral device is masked and permitting configuration of the peripheral device during a second configuration phase.

22. In a computer system having a processor, a bus coupled to the processor, and a configurable peripheral device coupled to the bus, a programmable select mask register, the programmable select mask register comprising:
a mask indicator corresponding to the peripheral device, the mask indicator for selectably masking the peripheral device, the programmable select mask register preventing configuration of the peripheral device during a first configuration phase when the peripheral device is masked and permitting configuration of the peripheral device during a first configuration phase when the peripheral device is unmasked; and
a configuration status indicator, the configuration status indicator for detecting a completion of a configuration operation, the configuration status register being reset before detecting a completion of a configuration operation and set after detecting a completion of a configuration operation, the configuration status indicator and the mask indicator conjunctively operating to prevent configuration of the peripheral device before detecting a completion of a configuration operation when the peripheral device is masked and further operating to permit configuration of the peripheral device both before detecting a completion of a configuration operation when the peripheral device is unmasked and after detecting a completion of a configuration operation.

23. In a computer system having a processor, a bus coupled to the processor, and a configurable peripheral device coupled to the bus, a programmable select mask register, the programmable select mask register comprising:
    a mask indicator corresponding to the peripheral device the mask indicator for selectably masking the peripheral device, the programmable select mask register preventing configuration of the peripheral device during a first configuration phase when the a peripheral device is masked and permitting configuration of the peripheral device during a first configuration phase when the peripheral device is unmasked, when the mask indicator permits configuration of the peripheral device, configuration is permitted according to a power on self-test (POST) routine that configures the peripheral device according to a Plug-and-Play configuration.

24. In a computer system having a processor, a bus coupled to the processor, and a configurable peripheral device coupled to the bus, a programmable select mask register, the proprammable select mask register comprising:
    a mask indicator corresponding to the peripheral device, the mask indicator for selectably masking the peripheral device, the programmable select mask register preventing configuration of the peripheral device during a first configuration phase when the a peripheral device is masked and permitting configuration of the peripheral device during a first configuration phase when the peripheral device is unmasked, the programmable select mask register configured to be programmable by a user interface, the user interface for allowing a user to selectively mask and unmask the peripheral device.

25. In a computer system having a processor, a bus coupled to the processor, and a configurable peripheral device coupled to the bus, a progammable select mask register, the programmable select mask register comprising:
    a mask indicator corresponding to the peripheral device, the mask indicator for selectably masking the peripheral device, the programmable select mask register preventing configuration of the peripheral device during a first configuration phase when the a peripheral device is masked and permitting configuration of the peripheral device during a first configuration phase when the peripheral device is unmasked, the programmable select mask register residing within the memory controller.

26. In a computer system having a processor, a bus coupled to the processor, and a configurable peripheral device coupled to the bus, a programmable select mask register, the programmable select mask register comprising:
    a mask indicator corresponding to the peripheral device, the mask indicator for selectably masking the peripheral device, the programmable select mask register preventing configuration of the peripheral device during a first configuration phase when the peripheral device is masked and permitting configuration of the peripheral device during a second configuration phase when the peripheral device is unmasked, the programmable select mask register coupled between the memory controller and the bus.

27. In a computer system having a processor, a bus coupled to the processor, and a configurable peripheral device coupled to the bus, a programmable select mask routine executable by the processor, the programmable select mask routine comprising:
    a mask indicator corresponding to the peripheral device, the mask indicator readable by the programmable select mask routine, the mask indicator for selectably masking the peripheral device, the programmable select mask routine preventing configuration of the peripheral device during a first configuration phase when the peripheral device is masked and permitting configuration of the peripheral device during a second configuration phase.

28. In a computer system having a processor, a bus coupled to the processor, and a configurable peripheral device coupled to the bus, a programmable select mask routine executable by the processor, the programmable select mask routine comprising:
    a mask indicator corresponding to the peripheral device, the mask indicator readable by the programmable select mask routine, the mask indicator for selectably masking the peripheral device, the programmable select mask routine preventing configuration of the peripheral device during a first configuration phase when the peripheral device is masked and permitting configuration of the peripheral device during a first configuration phase when the peripheral device is unmasked and the programmable select mask routine including a routine for altering a region within a PCI configuration space corresponding to the device.

29. The programmable select mask routine of claim 28, wherein:
    the programmable select mask routine assigns inconsistent resources to the peripheral device when the device is masked, preventing configuration of the device during a first configuration phase.

30. The programmable select mask routine of claim 28, wherein:
    the peripheral device has a device type identified within the PCI configuration space corresponding to the device; and
    the programmable select mask routine assigns resources to the peripheral device that are incompatible with the device type when the device is masked.

31. The programmable select mask routine of claim 28, wherein:
    the peripheral device has a device type identified within the PCI configuration space corresponding to the device; and
    when the device is masked, the programmable select mask routine assigns resources to the peripheral device that are incompatible with the device type, preventing configuration of the device during the first configuration phase.

32. The programmable select mask routine of claim 28, wherein:
    the peripheral device has a device type identified within the PCI configuration space corresponding to the device; and
    when the device is masked, the programmable select mask routine assigns a device driver to the peripheral device that is incompatible with the device type, preventing configuration of the device during the first configuration phase.

33. The programmable select mask routine of claim 28, wherein:

when the device is masked, the programmable select mask routine redundantly assigns at least two identical resource identifiers to the peripheral device, such that the first configuration phase can detect a redundancy and prevent configuration of the device during the first configuration phase.

34. The programmable select mask routine of claim 28, wherein:

when the device is masked, the programmable select mask routine assigns a device type of a non-memory device to the device and further assigning a memory descriptor to the device, within the configuration space.

35. The programmable select mask routine of claim 28, wherein:

at least two identical resource identifiers to the peripheral device, such that the first configuration phase can detect a redundancy and prevent configuration of the device during the first configuration phase.

36. The programmable select mask routine of claim 28, wherein:

the region within a PCI configuration space corresponding to the peripheral device includes a vector pointing to a non-executable instruction.

37. The programmable select mask routine of claim 28, wherein:

the region within a PCI configuration space corresponding to the peripheral device includes a vector pointing of zero.

38. The programmable select mask routine of claim 28, wherein:

the region within the PCI configuration space corresponding to the peripheral device includes a bit that when set indicates that the peripheral device is not configurable during the first configuration phase.

39. In a computer system having a processor, a bus coupled to the processor, and a configurable peripheral device coupled to the bus, a method executable by the processor, the method comprising the steps of:

reading a mask indicator corresponding to the peripheral device, the mask indicator for selectably masking the peripheral device;

during a first configuration phase, configuring the peripheral device during the first configuration phase when the peripheral device is unmasked and preventing configuration of the peripheral device when the peripheral device is masked;

during a second configuration phase, configuring the peripheral device.

40. The method of claim 39, wherein:

the step of configuring during the first phase and the step of configuring during the second phase each includes a power on self-test (POST) routine that configures the peripheral device according to a Plug-and-Play configuration.

41. The method of claim 39, further comprising steps of:

receiving a programming command from a user interface, the programming command corresponding to the peripheral device; and selectively masking and unmasking the mask indicator corresponding to the peripheral device.

42. The method of claim 39, wherein the step of reading a mask indicator comprises a step of:

before configuring, reading a mask indicator from a region within a PCI configuration space corresponding to the device.

43. The method of claim 39, further comprising a step of:

before reading, allowing a user to alter the mask indicator corresponding to the device.

44. The method of claim 43, wherein the step of reading a mask indicator comprises a step of:

before reading, allowing a user to alter a region within a PCI configuration space corresponding to the device.

45. The method of claim 44, wherein:

the step of allowing a user to alter a region within a PCI configuration space includes a step of assigning inconsistent resources to the peripheral device when the device is to be masked; and the step of configuring during the first configuration phase including steps of determining whether inconsistent resources (i.e., internally and mutually inconsistent, incompatible resources) are assigned to the peripheral device and of preventing configuration of the peripheral device during the first configuration phase when inconsistent resources are assigned to the peripheral device.

46. The method of claim 43, wherein:

the step of allowing a user to alter a region within a PCI configuration space includes a step of assigning inconsistent resources to the peripheral device when the device is to be masked; and the step of preventing configuration of the peripheral device when the a peripheral device is masked includes steps of:

determining whether a peripheral device type and a set of resources in the PCI configuration space corresponding to the peripheral device are incompatible; and preventing configuration of the peripheral device when at least one of the resources in the PCI configuration space is incompatible with the peripheral device type, during the first configuration phase.

47. The method of claim 43, wherein:

the step of allowing a user to alter a region within a PCI configuration space includes a step of assigning a driver to the peripheral device when the deviced is to be masked, the driver being imcompatible with the device type; and the step of preventing configuration of the peripheral device when the peripheral device is masked includes steps of:

determining whether a peripheral device type and a driver assigned to the peripheral device in the PCI configuration space corresponding to the peripheral device are imcompatible; and preventing configuration of the peripheral device when at least one of the assigned drivers in the PCI configuration space is compatible with the peripheral device type, during the first configuration phase.

48. The method of claim 43, wherein:

the step of allowing a user to alter a region within a PCI configuration space includes a step of redundantly assigning at least two identical resource identifiers to the peripheral device, such that the first configuration phase can detect a redundancy and prevent configuration of the device during the first configuration phase, when the device is to be masked; and the step of preventing configuration of the peripheral device when the peripheral device is masked includes steps of:
  determining whether at least two identical resource identifiers are redundantly assigned to the peripheral device, such that the first configuration phase can detect a redundancy and prevent configuration of the device during the first configuration phase; and
  preventing configuration of the peripheral device when at least two identical resource identifiers are redundantly assigned to the peripheral device, such that the first configuration phase can detect a redundancy and prevent configuration of the device during the first configuration phase during the first configuration phase.

49. The method of claim 43, wherein:
the step of allowing a user to alter a region within a PCI configuration space includes a step of assigning a device type of a non-memory device and a memory descriptor to the device, a device type of a non-memory device being inconsistent with a memory descriptor to the device, within the configuration space in the PCI configuration space corresponding to the peripheral device, when the device is to be masked; and
the step of preventing configuration of the peripheral device when the peripheral device is masked includes steps of:
  determining whether a device type of a non-memory device is assigned to the device and further determining whether a memory descriptor to the device, within the configuration space in the PCI configuration space corresponding to the peripheral device; and
  preventing configuration of the peripheral device when a device type of a non-memory device and a memory descriptor is assigned to the device, within the configuration space in the PCI configuration space corresponding to the peripheral device are incompatible.

50. The method of claim 43, wherein:
the step of allowing a user to alter a region within a PCI configuration space includes a step of assigning a vector pointing to a non-executable instruction to the region within a PCI configuration space corresponding to the peripheral device; and
the step of preventing configuration of the peripheral device when the peripheral device is masked includes steps of:
  determining whether a region within a PCI configuration space corresponding to the peripheral device includes a vector pointing to a non-executable instruction; and
  preventing configuration of the peripheral device when the region within a PCI configuration space corresponding to the peripheral device includes a vector pointing to a non-executable instruction.

51. The method of claim 43, wherein:
the step of allowing a user to alter a region within a PCI configuration space includes a step of assigning a vector pointing of zero to the region within a PCI configuration space corresponding to the peripheral device; and
the step of preventing configuration of the peripheral device when the peripheral device is masked includes steps of:
  determining whether a region within a PCI configuration space corresponding to the peripheral device includes a vector pointing of zero; and
  preventing configuration of the peripheral device when the region within a PCI configuration space corresponding to the peripheral device includes a vector pointing of zero.

52. The method of claim 43, wherein:
the step of allowing a user to alter a region within a PCI configuration space includes a step of assigning the region within the PCI configuration space corresponding to the peripheral device includes a bit that when set indicates that the peripheral device is not configurable during the first configuration phase, corresponding to the peripheral device; and
the step of preventing configuration of the peripheral device when the peripheral device is masked includes steps of:
  determining whether a region within a PCI configuration space corresponding to the peripheral device includes the region within the PCI configuration space includes a bit that when set indicates that the peripheral device is not configurable during the first configuration phase; and
  preventing configuration of the peripheral device when the region within the PCI configuration space corresponding to the peripheral device includes a bit that when set indicates that the peripheral device is not configurable during the first configuration phase.

53. The method of claim 39, wherein the step of preventing configuration of the peripheral device when the peripheral device is masked includes steps of:
  determining whether inconsistent resources are assigned to the peripheral device; and
  preventing configuration of the peripheral device during the first configuration phase when inconsistent resources are assigned to the peripheral device.

54. The method of claim 39, wherein the step of preventing configuration of the peripheral device when the peripheral device is masked includes steps of:
  determining whether a peripheral device type and a set of resources in the PCI configuration space corresponding to the peripheral device are incompatible; and
  preventing configuration of the peripheral device when at least one of the resources in the PCI configuration space is incompatible with the peripheral device type, during the first configuration phase.

55. The method of claim 39, wherein the step of preventing configuration of the peripheral device when the peripheral device is masked includes steps of:
  determining whether a peripheral device type and a driver assigned to the peripheral device in the PCI configuration space corresponding to the peripheral device are incompatible; and
  preventing configuration of the peripheral device when at least one of the assigned drivers in the PCI configuration space is incompatible with the peripheral device type, during the first configuration phase.

56. The method of claim 39, wherein the step of preventing configuration of the peripheral device when the peripheral device is masked includes steps of:
  determiing whether a peripheral device type and a driver assigned to the peripheral device in the PCI configuration space corresponding to the peripheral device are incompatible; and
  preventing configuration of the peripheral device when at least one of the assigned drivers in the PCI configuration space is incompatible with the peripheral device type, during the first configuration phase.

57. The method of claim 39, wherein the step of preventing configuration of the peripheral device when the peripheral device is masked includes steps of:

determining whether a device type of a non-memory device is assigned to the device and further determining whether a memory descriptor to the device, within the configuration space in the PCI configuration space corresponding to the peripheral device; and preventing configuration of the peripheral device when a device type of a non-memory device and a memory descriptor is assigned to the device, within the configuration space in the PCI configuration space corresponding to the peripheral device are incompatible.

58. The method of claim 39, wherein the step of preventing configuration of the peripheral device when the peripheral device is masked includes steps of:

determining whether a region within a PCI configuration space corresponding to the peripheral device includes a vector pointing to a non-executable instruction; and preventing configuration of the peripheral device when the region within a PCI configuration space corresponding to the peripheral device includes a vector pointing to a non-executable instruction.

59. The method of claim 39, wherein the step of preventing configuration of the peripheral device when the peripheral device is masked includes steps of:

determining whether a region within a PCI configuration space corresponding to the peripheral device includes a vector pointing of zero; and preventing configuration of the peripheral device when the region within a PCI configuration space corrspondig to the peripheral device includes a vector pointing of zero.

60. The method of claim 39, wherein the step of preventing configuration of the peripheral device when the peripheral device is masked includes steps of:

determining whether the region within the PCI configuration space corresponding to the peripheral device includes a bit that when set indicates that the peripheral device is not configurable during the first configuration phase; and preventing configuration of the peripheral device when the region within the PCI configuration space corresponding to the peripheral device includes a bit that when set indicates that the peripheral device is not configurable during the first configuration phase.

61. A computer system, comprising:

a processor for executing instructions, the processor capable of asserting a first signal in response to an instruction;

a bus, coupled to receive the first signal from the processor;

a memory, coupled to the bus, the memory for storing data and instructions;

a configurable component device, coupled to receive a signal from the bus, the device being responsive to the signal, the device being disabled according to the signal during a first configuration phase and the device being enabled during a subsequent configuration phase.

62. The computer system of claim 61, wherein:

the processor is coupled to provide a first signal to a first bus in response to an instruction; and the device is coupled to receive a second signal on a second bus responsive to the first signal on the first bus.

63. The computer system of claim 61, wherein the switch is an integral part of the device.

64. The computer system of claim 61, wherein the switch is an integral part of a connector coupled to the bus, the connector for receiving devices.

65. The computer system of claim 61, wherein:

the signal is provided by the processor in response to an instruction generated by an operating system executing on the processor, and the memory contains a set of instructions that when executed on the processor cause the processor to assert the signal, the device being enabled or disabled in response to the signal.

66. The computer system of claim 61, wherein:

the signal is provided by the processor in response to an instruction generated by an application executing on the processor, and the memory contains a set of instructions that when executed on the processor cause the processor to assert the signal, the device being enabled or disabled in response to the signal.

67. The computer system of claim 61, further comprising:

a peripheral interrupt controller coupled to the bus, the peripheral interrupt controller receiving the first signal from the processor and providing a second signal to the bus in response to the first signal, and wherein:

the device is coupled to receive the second signal from the bus.

68. The computer system of claim 67, wherein the peripheral interrupt controller has a finite number of connectors, the configurable component device being coupled to at least one of the connectors.

69. The computer system of claim 68, wherein the programmable peripheral interrupt controller has at least two connectors for coupling to a finite number of configurable component devices, one of conector being coupled to the configurable device.

* * * * *